(12) United States Patent
Marinier et al.

(10) Patent No.: US 12,132,577 B2
(45) Date of Patent: Oct. 29, 2024

(54) METHODS AND APPARATUSES FOR IMPROVED VOICE COVERAGE

(71) Applicant: INTERDIGITAL PATENT HOLDINGS, INC., Wilmington, DE (US)

(72) Inventors: Paul Marinier, Brossard (CA); Faris Alfarhan, Montreal (CA); Ghyslain Pelletier, Montreal (CA); Aata El Hamss, Laval (CA); Fumihiro Hasegawa, Westmount (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/918,735

(22) PCT Filed: Apr. 14, 2021

(86) PCT No.: PCT/US2021/027310
§ 371 (c)(1),
(2) Date: Oct. 13, 2022

(87) PCT Pub. No.: WO2021/211728
PCT Pub. Date: Oct. 21, 2021

(65) Prior Publication Data
US 2023/0239080 A1  Jul. 27, 2023

Related U.S. Application Data

(60) Provisional application No. 63/091,669, filed on Oct. 14, 2020, provisional application No. 63/009,664, filed on Apr. 14, 2020.

(51) Int. Cl.
*H04L 1/1812* (2023.01)
*H04L 1/1867* (2023.01)

(52) U.S. Cl.
CPC .......... *H04L 1/1816* (2013.01); *H04L 1/189* (2013.01); *H04L 1/1893* (2013.01)

(58) Field of Classification Search
CPC ..... H04L 1/1816; H04L 1/189; H04L 1/1893; H04L 1/1887; H04L 5/0044; H04L 5/0091; H04L 1/1822; H04L 1/08
(Continued)

(56) References Cited

U.S. PATENT DOCUMENTS 8,621,310 B2 * 12/2013 Terry ................... H04L 1/1812
  714/749
8,938,643 B1 * 1/2015 Karmarkar .......... G06F 11/2048
  714/11

(Continued)

OTHER PUBLICATIONS

IEEE Standard for Information technology—Telecommunications and information exchange between systems Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Albert Decady
*Assistant Examiner* — Osman M Alshack
(74) *Attorney, Agent, or Firm* — VOLPE KOENIG

(57) ABSTRACT

Methods and apparatus are described herein for improved efficiency of a wireless transmit/receive unit (WTRU) transmitting transport blocks (TBs). A WTRU may receive configuration information including uplink resources associated with one or more repetition bundles and a target number of retransmissions for a transport block (TB) associated with at least one hybrid automatic repeat request (HARQ) process. Then, the WTRU may transmit a first TB using a first uplink resource in a first repetition bundle based on the configuration information. Further, the WTRU may increment a retransmission counter. On a condition that the retransmis- (Continued)

sion counter is less than the target number of retransmissions, the WTRU may determine a second uplink resource. Further, the WTRU may retransmit the first TB in the determined second uplink resource. Also, the WTRU may further increment the retransmission counter. Moreover, the first, second and third uplink resources may be physical uplink shared channel (PUSCH) resources.

18 Claims, 9 Drawing Sheets

(58) Field of Classification Search
USPC .................................................. 714/748–750
See application file for complete search history.

(56) References Cited

U.S. PATENT DOCUMENTS

| | | | | |
|---|---|---|---|---|
| 2013/0343273 | A1* | 12/2013 | Barbieri | H04L 1/1822 370/328 |
| 2014/0056278 | A1* | 2/2014 | Marinier | H04W 72/044 370/330 |
| 2014/0307597 | A1* | 10/2014 | Kim | H04L 5/1469 370/280 |
| 2015/0229444 | A1* | 8/2015 | Webb | H04L 5/0078 370/329 |
| 2017/0295584 | A1* | 10/2017 | Uchino | H04L 1/1822 |
| 2019/0058986 | A1* | 2/2019 | Loehr | H04L 1/1825 |
| 2019/0320467 | A1* | 10/2019 | Freda | H04W 74/004 |
| 2019/0327027 | A1 | 10/2019 | Webb et al. | |
| 2020/0146032 | A1* | 5/2020 | Bae | H04L 1/1819 |
| 2020/0146034 | A1* | 5/2020 | Bagheri | H04W 72/1268 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.Nov. 2020 (Dec. 3, 2020).

Interdigital, "Pusch repetition for coverage enhancements," 3GPP TSG RAN WG1 #104-e, R1-2100731, e-Meeting (Jan. 25-Feb. 5, 2021).

Interdigital, Inc., "PUSCH coverage enhancements," 3GPP TSG RAN WG1 #103-e, R1-2008483, e-Meeting (Oct. 26-Nov. 13, 2020).

Third Generation Partnership Project, "Technical Specification Group Radio Access Network; NR; Medium Access Control (MAC) protocol specification (Release 16)," 3GPP TS 38.321 V16.0.0 (Mar. 2020).

Third Generation Partnership Project, "Technical Specification Group Radio Access Network; NR; Medium Access Control (MAC) protocol specification (Release 16)," 3GPP TS 38.321 V16.4.0 (Mar. 2021).

* cited by examiner

METHODS AND APPARATUSES FOR IMPROVED VOICE COVERAGE

CROSS-REFERENCE TO RELATED APPLICATIONS

This application is the U.S. National Stage, under 35 U.S.C. § 371, of International Application No. PCT/US2021/027310 filed Apr. 14, 2021, which claims the benefit of U.S. Provisional Application No. 63/009,664, filed Apr. 14, 2020 and U.S. Provisional Application No. 63/091,669, filed Oct. 14, 2020, the contents of which are incorporated herein by reference.

BACKGROUND

In New Radio (NR), a wireless transmit/receive unit (WTRU) may be configured with a configured uplink grant to perform an initial transmission for a transport block (TB). The configured uplink grant may be used for a retransmission for a hybrid automatic repeat request (HARQ) process. The WTRU may start a timer when the WTRU performs the initial transmission for a TB. A configured uplink grant may be used for a retransmission for a HARQ process if the timer is running.

The WTRU may consider a new data indicator (NDI) as toggled upon expiry of the timer. In other words, the WTRU may flush the buffer for the concerned HARQ process. HARQ retransmissions can thus be performed using the resources assigned by a configured grant only until the timer expires.

In NR, the WTRU may be configured with a number of repetitions, such as repK repetitions, for a given grant. A repetition enables the WTRU to perform subsequent HARQ retransmissions with minimal latency and no control signaling overhead. Each transmission in a repetition for a given HARQ process includes a HARQ retransmissions for the given HARQ process. The retransmission may be, for example, a transmission with a different redundancy version, such as when soft combining is used. Repetitions may be useful to ensure that sufficient energy is transmitted by the WTRU such that the block error rate (BLER) target can be met in high path loss scenarios.

SUMMARY

Methods and apparatus are described herein for improved efficiency of a wireless transmit/receive unit (WTRU) transmitting transport blocks (TBs). In an example, a WTRU may receive configuration information including uplink resources associated with one or more repetition bundles and a target number of retransmissions for a transport block (TB) associated with at least one hybrid automatic repeat request (HARQ) process. Then, the WTRU may transmit a first TB using a first uplink resource in a first repetition bundle based on the configuration information. Further, the WTRU may increment a retransmission counter. On a condition that the retransmission counter is less than the target number of retransmissions, the WTRU may determine a second uplink resource. Further, the WTRU may retransmit the first TB in the determined second uplink resource. Also, the WTRU may further increment the retransmission counter.

In a further example, on a condition that the retransmission counter is greater than or equal to the target number of retransmissions, the WTRU may reset the retransmission counter, toggle a new data indicator (NDI), determine a third uplink resource and transmit a second TB in the determined third uplink resource. In another example, the first uplink resource, the second uplink resource and the third uplink resource may be physical uplink shared channel (PUSCH) resources. Also, the first uplink resource, the second uplink resource and the third uplink resource may be configured grant (CG) resources. Further, the configuration information may include CG information. In addition, the first uplink resource, the second uplink resource and the third uplink resource may be dynamic resources. Further, the configuration information may include dynamic grant information. In an example, the first uplink resource, the second uplink resource and the third uplink resource may be time division duplex (TDD) resources.

Moreover, the second uplink resource may be in the last slot in a repetition bundle. Further, the second uplink resource may be in the first repetition bundle, in an example. In another example, the second uplink resource may be in the second repetition bundle. In addition, the NDI may be toggled at the end of a repetition bundle.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
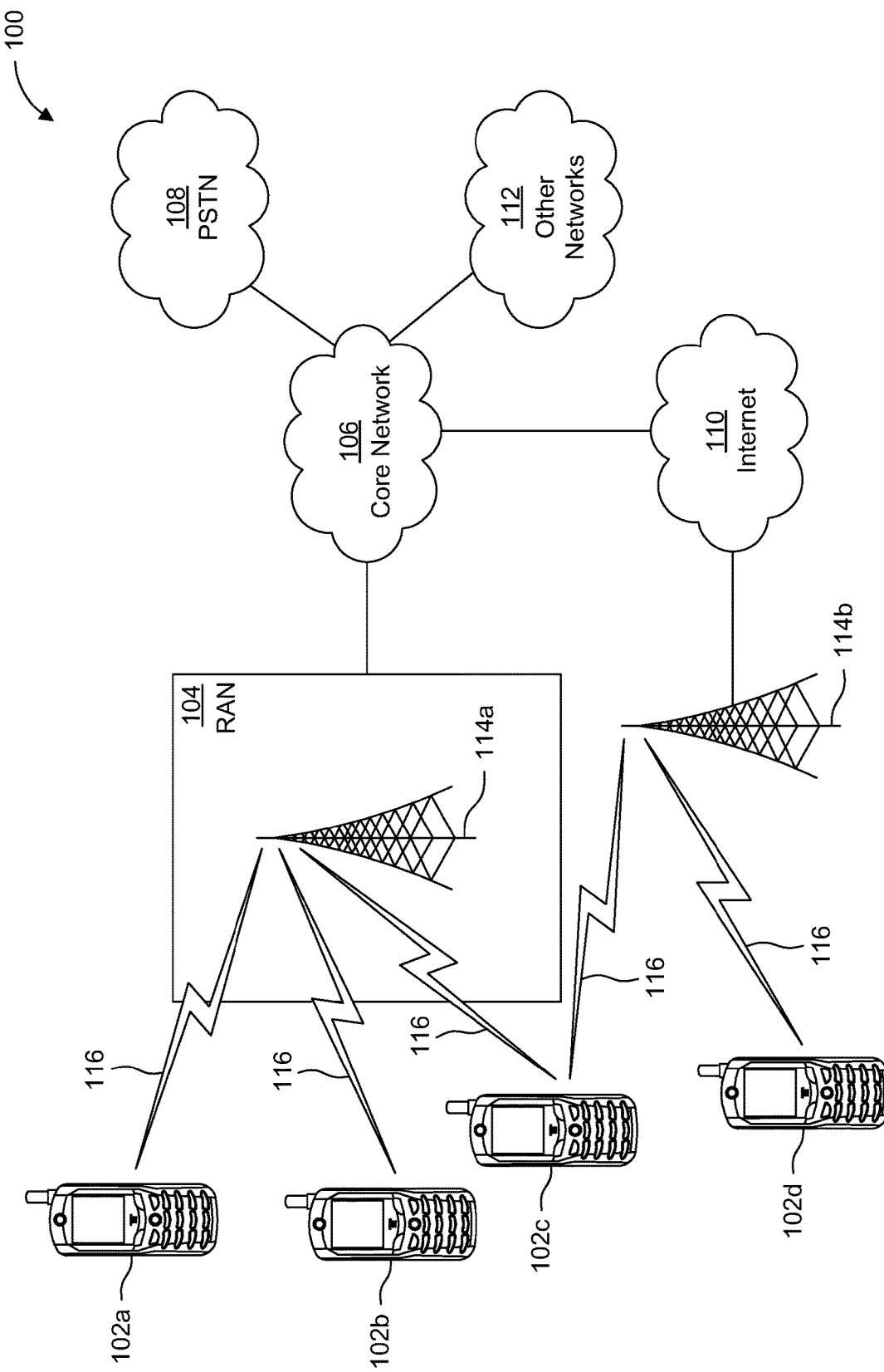
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (for example, radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (for example, an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (for example, for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (for example, WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (for example, the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
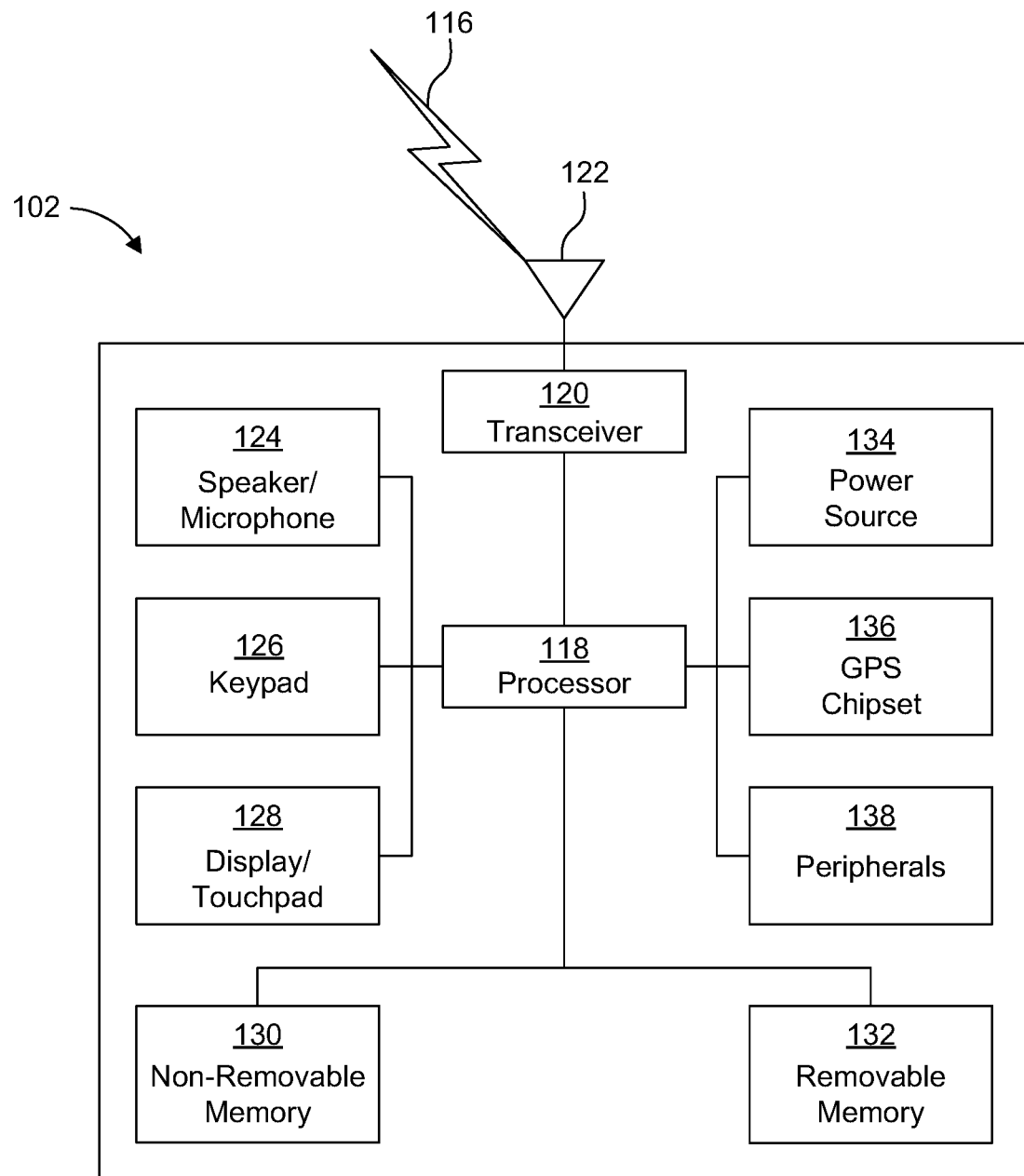
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (for example, associated with particular subframes for both the UL (for example, for transmission) and DL (for example, for reception) may be concurrent and/or simultaneous. The full duplex radio may include an interference management unit to reduce and or substantially eliminate self-interference via either hardware (for example, a choke) or signal processing via a processor (for example, a separate processor (not shown) or via processor 118). In an embodiment, the WTRU 102 may include a half-duplex radio for which transmission and reception of some or all of the signals (for example, associated with particular subframes for either the UL (for example, for transmission) or the DL (for example, for reception)).

Figure 1C:
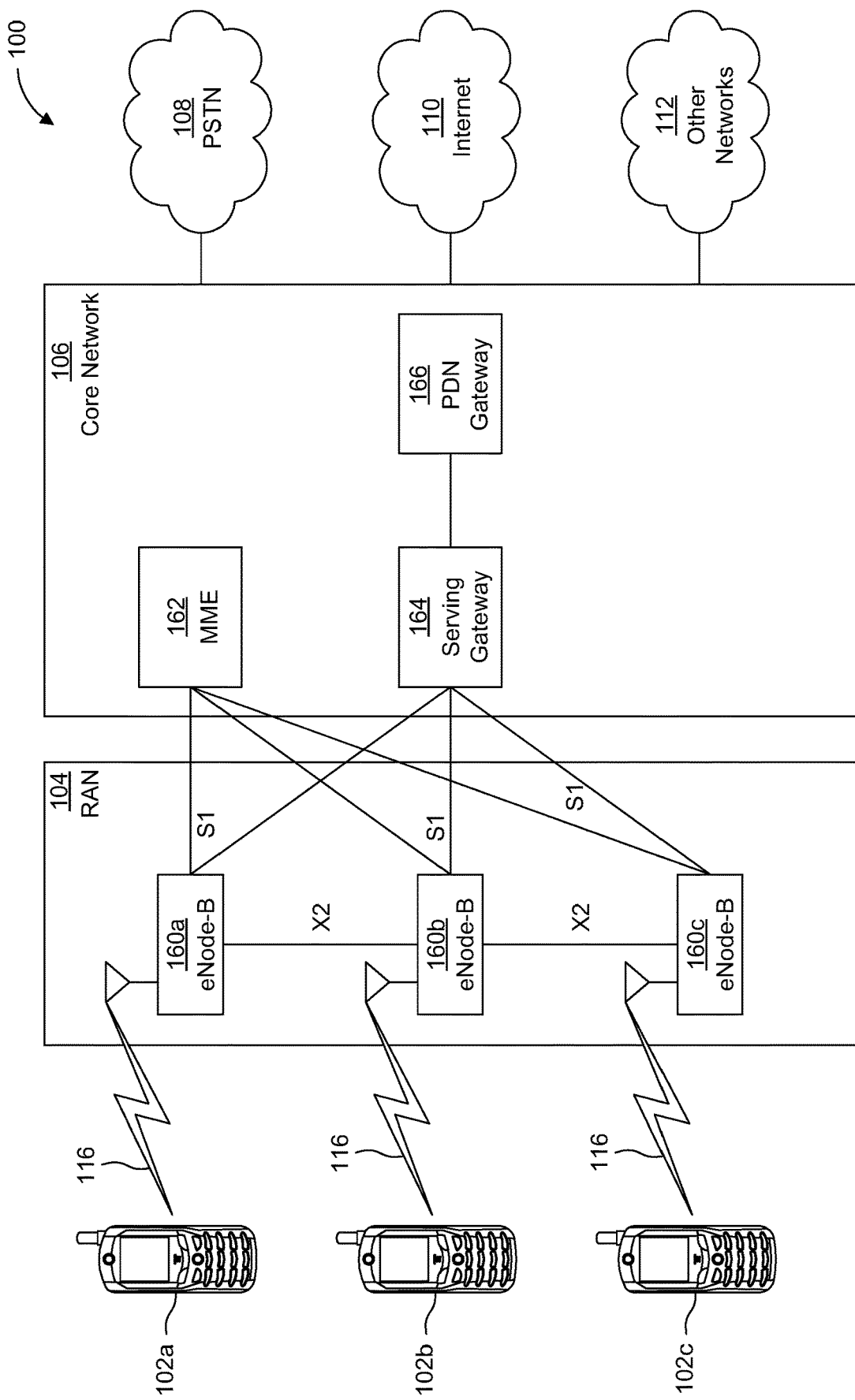
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (for example, temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (for example, directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (for example, all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (for example, 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (for example, every STA), including the AP, may sense the primary channel. If the primary channel is sensed/detected and/or determined to be busy by a particular STA, the particular STA may back off. One STA (for example, only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (for example, only support for) certain and/or limited bandwidths. The MTC devices may include a battery with a battery life above a threshold (for example, to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (for example, MTC type devices) that support (for example, only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
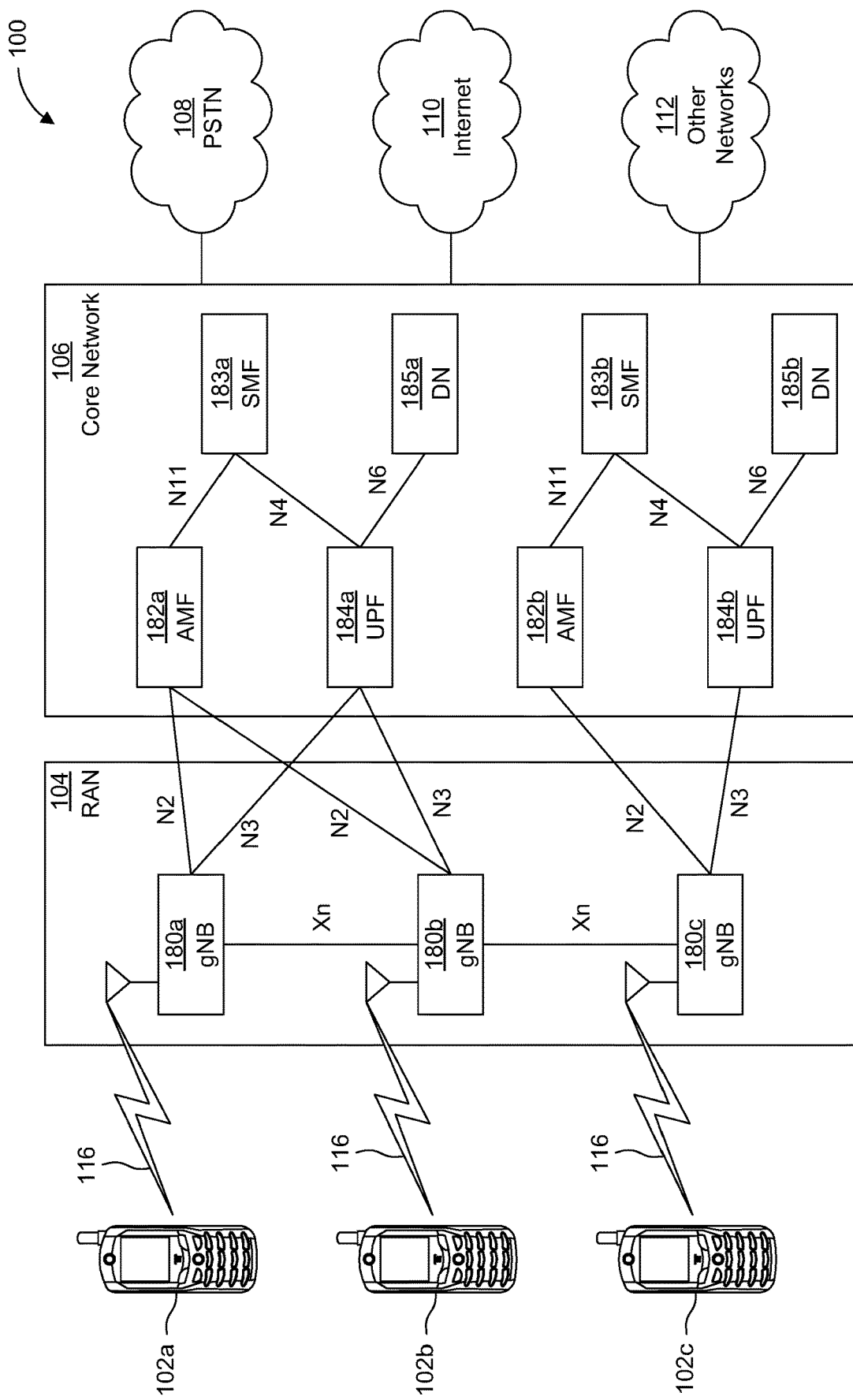
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology.

For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (for example, containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (for example, such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (for example, handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (for example, testing) wired and/or wireless communication network in order to implement testing of one or more components. The one or more emulation devices may be test equipment. Direct RF coupling and/or wireless communications via RF circuitry (for example, which may include one or more antennas) may be used by the emulation devices to transmit and/or receive data.

In NR, the WTRU may be configured with a configured uplink grant. A WTRU may perform an initial transmission for a transport block (TB) using the configured uplink grant. The WTRU may start a timer when it performs the initial transmission for a TB. A configured uplink grant may be used for a retransmission for a hybrid automatic repeat request (HARQ) process if the timer is running. The WTRU may consider a new data indicator (NDI) as toggled upon expiry of the timer. In other words, the WTRU may flush the buffer for the concerned HARQ process. HARQ retransmissions can thus be performed using the resources assigned by a configured uplink grant until the timer expires.

Also in NR, the WTRU may be configured with multiple repetitions, such as repK repetitions, for a given grant. A repetition enables the WTRU to perform subsequent HARQ retransmissions with minimal latency and no control signaling overhead. Each transmission in a repetition for a given HARQ process includes HARQ retransmissions for the given HARQ process. The retransmission may be, for example, a transmission with a different redundancy version, such as when soft combining is used. Repetitions may be useful to ensure that sufficient energy is transmitted by the WTRU such that the block error rate (BLER) target can be met in high path loss scenarios.

The following terminology is used and can be assumed through this disclosure:
CG Configured grant or cell group
DG Dynamic grant
CAPC Channel access priority class
DFI Downlink feedback information
HARQ PID HARQ Process ID
MAC CE MAC control element
ACK Acknowledgement
BLER Block Error Rate
BWP Bandwidth Part
CAP Channel Access Priority
CCA Clear Channel Assessment
CP Cyclic Prefix
CP-OFDM Conventional OFDM (relying on cyclic prefix)
CQI Channel Quality Indicator
CRC Cyclic Redundancy Check
CSI Channel State Information
CW Contention Window
CWS Contention Window Size
CO Channel Occupancy
DAI Downlink Assignment Index
DCI Downlink Control Information
DL Downlink
DM-RS Demodulation Reference Signal
DRB Data Radio Bearer
HARQ Hybrid Automatic Repeat Request
LAA License Assisted Access
LBT Listen-Before-Talk
LTE Long Term Evolution for example from 3GPP LTE R8 and up
NACK Negative ACK
MCS Modulation and Coding Scheme
MIMO Multiple Input Multiple Output
NR New Radio
OFDM Orthogonal Frequency-Division Multiplexing
PHY Physical Layer
PRACH Physical Random Access Channel
PSS Primary Synchronization Signal
RACH Random Access Channel (or procedure)
RAR Random Access Response
RCU Radio access network Central Unit
RF Radio Front end
RLF Radio Link Failure
RLM Radio Link Monitoring
RNTI Radio Network Temporary Identifier
RRC Radio Resource Control
RRM Radio Resource Management
RS Reference Signal
RSRP Reference Signal Received Power
RSSI Received Signal Strength Indicator
SDU Service Data Unit
SLIV Start and Length Indicator Value
SRS Sounding Reference Signal
SS Synchronization Signal
SSS Secondary Synchronization Signal
SWG Switching Gap (in a self-contained subframe)
SPS Semi-persistent scheduling
SUL Supplemental Uplink
TB Transport Block
TBS Transport Block Size
TRP Transmission/Reception Point
TSC Time-sensitive communications
TSN Time-sensitive networking
UL Uplink
URLLC Ultra-Reliable and Low Latency Communications
WLAN Wireless Local Area Networks and related technologies (IEEE 802.xx domain)

From the network's perspective, a scheduler typically operates using a target HARQ operation point. The HARQ operating point may be viewed as the number of HARQ transmissions required for successful reception and decoding of a TB, in other words, to reach a sufficient amount of received energy per transmitted bit. A scheduler may vary the HARQ operating point to optimize resource usage, for example, a number of physical resource blocks (PRBs) for the transmission of a given TB; transmission power, for example, more transmissions each of less power, or vice-versa; and/or latency, for example, fewer transmissions typically completes the transmission of the TB earlier in time. A scheduler can generally adapt a HARQ operating point by varying the number of PRBs, the assigned modulation and coding scheme (MCS) and/or the transmission power to implement different strategies for the accumulation of transmitted energy at the receiver.

In some examples and embodiments, voice traffic, for example, VoIP traffic, may be transmitted with minimal signaling overhead by using configured uplink grants. The traffic pattern of VoIP traffic is typically characterized as being relatively periodic, for example, one new voice packet generated every x ms, with small amount(s) of data for each packet.

When a WTRU transmits data using one or more configured uplink grants with a semi-statically configured number of physical uplink shared control channel (PUSCH) repetitions, the actual number of repetitions for a specific TB may vary based on certain events. For example, a PUSCH configured by higher layers may not be transmitted if a slot format indicator (SFI) from a detected downlink control information (DCI) does not indicate the set of symbols as uplink. In another example, a PUSCH may be pre-empted by another uplink transmission of higher priority. In unlicensed spectrum, a PUSCH may not be transmitted if the WTRU fails to access the channel.

In addition, additional impairments may occur for an actual transmission. For example, power scaling may be required.

Another event that may have an effect similar as missed PUSCH repetition(s) is when the instantaneous channel quality, and thus the received power, is lower than average at the time of transmission. For a given MCS, the probability of error for a TB is sensitive to the actual number of PUSCH repetitions that are received with adequate quality. Thus, the maximum path loss for which the BLER target is met may be degraded significantly when the actual number of repetitions is occasionally less than the required number. In an example, the BLER target may be 2% for voice or VoIP traffic. Further, the BLER target may be considered to be used for the coverage for the service.

The various examples and embodiments described in the following herein may improve coverage by minimizing or eliminating variations in the number of actual repetitions of a TB, or more generally, the total received energy, even when certain PUSCH transmissions are delayed or preempted. These examples and embodiments may minimize the need for the network to use dynamic grants to ensure that a TB is successfully received.

In the examples provided herein, properties of a grant or assignment may include at least one of, but are not limited to: a frequency allocation; an aspect of time allocation such as a duration; a priority; an MCS; a TB size; a number of spatial layers; a number of TBs; a transmission configuration indicator (TCI) state, channel state information (CSI)-reference signal (RS) resource indicator (CRI) or sounding reference signal (SRS) resource index (SRI); a number of repetitions; an indication whether the repetition scheme is Type A or Type B; an indication whether the grant is a configured grant type 1, type 2 or a dynamic grant; an indication whether the assignment is a dynamic assignment or a semi-persistent scheduling (configured) assignment; a configured grant index or a semi-persistent assignment index; a periodicity of a configured grant or assignment; a channel access priority class (CAPC); and any parameter provided in DCI, by MAC or by radio resource control (RRC) for the scheduling the grant or assignment.

In the examples provided herein, an indication by DCI may include one or more of, but are not limited to: an explicit indication by a DCI field or by a radio network temporary identifier (RNTI) used to mask a cyclic redundancy check (CRC) of the physical downlink control channel (PDCCH); an implicit indication by a property such as DCI format, DCI size, Coreset or search space; aggregation level; and first resource element of the received DCI, where the mapping between the property and the value may be signaled by RRC or MAC. In an example, the first resource element of the received DCI may be the index of first Control Channel Element.

Examples including a target HARQ operating point are described herein. The examples provided herein may be used by themselves or in any combination with each other.

In one example, the WTRU may be configured with a grant that further includes a property that represents a target HARQ operating point. Such information may be configured by RRC. In an example, a target operating point may be represented by $TB_{target}$. Further the target operating point may be represented according to at least one of the following properties: a target amount of energy per bit transmitted for the TB; and/or a target number of transmissions for the TB.

Examples for stopping transmissions using configured information, with a wait time for dynamic scheduling, are described herein.

In one example, the WTRU may be configured with a timer. In an example, the timer may be represented by $T_{flush}$. Such timer information may be configured by RRC. Such a timer may be useful to enable additional time for reception of scheduling information for additional HARQ retransmissions for the TB, after the WTRU determines that it has completed the minimal and/or mandatory transmissions for the HARQ process and/or after it has suspended the HARQ process, before the WTRU may flush the HARQ buffer and/or consider NDI as having been toggled.

Example realizations using a timer are described herein. In one example, the WTRU may determine that it may suspend a HARQ process when it determines that the target is reached, such as target $TB_{target}$ is reached. For example, the WTRU may start a timer, such as timer $T_{flush}$: the WTRU may (re)-start the timer when the WTRU performs a retransmission for the concerned HARQ process, upon reception of a retransmission grant/DCI for the HARQ process, and/or when the WTRU first determines that the HARQ process is suspended. Further, the WTRU may consider the NDI as toggled and/or flush the HARQ buffers upon expiration of the timer. In another example, the WTRU may update the timer only while in discontinuous reception (DRX) Active Time, for example, if DRX is configured. In another example, the WTRU may perform further retransmissions for a suspended HARQ process only upon reception of explicit dynamic scheduling information, for example from the reception of DCI on a PDCCH for the concerned HARQ process.

In another example, the WTRU may perform further retransmissions for a suspended HARQ process upon reception of DCI on a PDCCH while a timer is running. In an example, the timer may be a $T_{flush}$ timer. In a further example, the timer is running when the timer has not expired. In one example realization, the WTRU may apply the functions described herein for $T_{flush}$ to a configured grant timer.

Examples for target latency are described herein. In one example, the WTRU may be additionally configured with a target latency. In an example, the WTRU may be configured by RRC. In a further example, the target latency may be or may include the maximum time available between the initial transmission for the TB until the transmission that can first meet the target HARQ operating point. Additionally, the WTRU may suspend the HARQ process for the TB, toggle the NDI and/or consider NDI as having been toggled when a time that corresponds to the target latency has elapsed.

Examples described herein include that the target is an amount of transmitted energy per bit for a TB. For example, the WTRU may reset the cumulative amount of transmitted power for a given HARQ process to zero when it determines that the NDI is toggled, or considering having been toggled; and/or when the WTRU determines that it is performing the initial HARQ transmission for a given TB/HARQ process. The WTRU may stop performing HARQ retransmissions for a given TB when it determines that the cumulative amount of power, or energy, allocated to transmissions for the concerned HARQ process is equal to or higher than the configured value for a target, such as a $TB_{target}$. In an example, the WTRU may consider any change, for example, reduction, or reduction only, in transmission power due to open power control loop, closed power control loop, maximum power reduction (MPR)/power-management-MPR (P-MPR) to meet specific absorption rate (SAR) requirements or similar, reception of group/common, for example, transmit power control (TPC) signaling, for example, in DCI, that indicates a change in transmission power, higher or lower, and/or power scaling/power boosting applied based on a typical power allocation procedure. In another example, the WTRU may consider any change to the used MCS and/or uplink grant used for repetitions or retransmissions, by resetting or adjusting the cumulative amount of transmitted power for the concerned TB.

Examples including a target based on counting are descried herein. In an example, the WTRU may reset the count of transmissions for a given HARQ process to zero (0) when it determines that the NDI is toggled, or considering having been toggled, and/or when the WTRU determines that the WTRU is performing the initial HARQ transmission for a given TB/HARQ process. The WTRU may stop performing HARQ retransmissions for a given TB when the WTRU determines that the number of transmission occasions for the concerned HARQ process is equal to or higher than the configured value for a target, such as a $TB_{target}$. In an example, the transmission occasions may include an opportunity to perform a transmission. In another example, the transmission occasions may include an actual transmission. In one example, the WTRU may count transmissions that it has performed according to a specific criterion, as explained further below.

Examples including NDI toggling based on a target number of retransmissions are described herein. Further, examples provided herein may include counter-based NDI toggling.

In an embodiment, the WTRU may determine a counter of transmissions, transmission counter or retransmission counter, performed for a TB for at least one HARQ process. The WTRU may increment such a counter for every transmission or retransmission of a TB, possibly subject to additional conditions described below. The WTRU may reset the counter to zero (0) when an NDI bit is toggled or is considered to have been toggled. In some embodiments, the WTRU may also reset the counter to zero (0) upon reception of a dynamic grant for the HARQ process, possibly even if an NDI is not toggled.

The terms transmission counter and retransmission counter may be used interchangeably in examples and embodiments provided herein. Further, in examples and embodiments provided herein, the terms time unit, slot and symbol may be used interchangeably. Also, in examples and embodiments provided herein, the terms set of time units, frame and slot may be used interchangeably.

The WTRU may determine a target number of transmissions for each TB. The WTRU may consider the NDI bit(s) for this HARQ process to have been toggled if the transmission counter becomes equal to, or exceeds, the target number of transmissions. Such a method may be referred to as counter-based NDI toggling in the examples and embodiments provided herein. The counter-based NDI toggling may be applied along with other conditions for toggling NDI, such as based on timer expiry or based on an explicit indication from DCI.

Examples for counter-based NDI toggling behavior in cases of repetition bundle are described herein. In some examples, counter-based NDI toggling may occur before completion of a repetition bundle for a configured grant or dynamic grant. The WTRU may apply at least one of the following examples to determine if this counter-based NDI toggling occurs.

In an example, a bundle may include one or more time units. For example, a bundle may include one or more slots. In another example, a bundle may include one or more symbols.

In a first example, the WTRU may reset the transmission counter or reset the transmission counter if indicated by a field of the DCI. In some examples, such a field could be the NDI field. In another example, in case the counter exceeds the target number of retransmissions before the last repetition of the bundle, the WTRU may toggle an NDI after transmitting the last repetition. In a further example, the WTRU may apply such behavior if indicated by a field of the DCI. In an example, the DCI may be received by the WTRU in a dynamic grant. In some examples, the field of the DCI may be the NDI field.

Examples of applicable conditions involving counter-based NDI toggling are described herein. The WTRU may apply counter-based NDI toggling for a TB or for a HARQ process if at least one of the following conditions is met. In an example, the TB may include data from at least one logical channel (LCH) or LCH group for which counter-based NDI toggling is applicable. The applicability to an LCH or LCH group may be configured by RRC or signaled by a MAC control element (CE).

In another example, MAC or RRC signaling may indicate that counter-based NDI toggling is applicable for the HARQ process. In a further example, RRC signaling may indicate that counter-based NDI toggling is applicable for the grant, for example, in case of a configured grant.

In an additional example, DCI may indicate that counter-based NDI toggling is applicable for the TB. For example, counter-based NDI toggling may be applicable in a case where an initial transmission is from a dynamic grant or from a configured grant type 2.

In a further example, counter-based NDI toggling may be applicable based on at least one property of the grant, such as listed in examples provided herein. For example, this property may depend on a physical layer priority of the grant.

Examples of determining a target number of transmissions are described herein. In one example, the WTRU may determine a target HARQ operating point, such as a target number of transmissions for a TB or HARQ process based on signaling by DCI, MAC or RRC for the HARQ process or for the grant. In an example, the grant may include configured grant type 1 or type 2.

In another example, the WTRU may determine a target HARQ operating point, such as a target number of transmissions for a TB or HARQ process based on TB size or MCS. For example, RRC or MAC signaling may include a target number of transmissions for each of a set of TB sizes. Alternatively or additionally, the target number of repetitions for a TB size may be derived from a formula using at least one parameter, such as the smallest integer larger than a parameter multiplied by the TB size. The value(s) of the at least one parameter may be pre-defined or included in RRC or MAC signaling.

In another example, the WTRU may determine a target HARQ operating point, such as a target number of transmissions for a TB or HARQ process, using the number of retransmissions used for a previous transmission. For example, the previous transmission may be associated with the same HARQ process identifier (ID). In another example, the previous transmission may be associated with a similar priority level as for the data of highest priority in the TB. In an additional example, the previous transmission may be associated with a similar priority level as the priority level associated for the selected configured grant for the TB.

Examples for determining whether to increment a transmission counter are described herein. In an example, for a PUSCH transmission scheduled by a dynamic or configured grant, the WTRU may increment the transmission counter for a HARQ process unless at least one of the following conditions is met. One example condition may include that the PUSCH transmission is dropped or cancelled due to a conflict with a transmission of higher priority or due to reception of a cancellation indication. Another example condition may include that the PUSCH cannot be transmitted according to a slot format indication.

In a further example condition, the PUSCH cannot be transmitted based on channel access rules in unlicensed spectrum. The channel access rules may include listen-before-talk rules, in an example.

A further example condition may include that a transmission power reduction takes place for the PUSCH transmission. Further, an example condition may include that a transmission power reduction takes place for any transmission overlapping with the PUSCH transmission in the time domain.

An additional example condition may include that a power headroom is below a threshold. The threshold may be signaled by RRC or MAC signaling.

Another example condition may include that an indication of not incrementing the counter is received by the WTRU from DCI. In example, the DCI may include a DCI scheduling PUSCH or a DCI received by group-common signaling.

A further example condition may include that channel quality indicator (CQI) for a CSI report configuration is below a configured threshold. The WTRU may be initially configured with the threshold.

Examples including a metric update in case of energy-based NDI toggling are described herein. In some examples, a HARQ target operating point may be represented by a target amount of energy per bit transmitted for the TB instead of a target number of transmissions. The examples described herein above may also be applicable in case that the metric is a target amount of energy.

One or more of the following examples may also be applicable when determining the increase of the energy metric for a PUSCH transmission. The energy metric may be increased by an amount indicated from DCI, or a property thereof, such as the DCI scheduling PUSCH or DCI received by group-common signaling. Further, the energy metric may be increased by an amount depending on a scaling factor in case transmission power reduction takes place. Also, the energy metric may be increased by an amount depending on a latest power headroom or a CQI available at the time of the PUSCH transmission. Additionally or alternatively, the energy metric may be increased by an amount a function of, or corresponding to, a number of transmitted symbols in time domain.

In one example, the energy metric may comprise a total number of transmitted symbols. In such case, embodiments described above for the counter-based NDI toggling may be applicable, except that the counter may be incremented by a number of transmitted symbols for each transmission and the target may be in terms of a total number of transmitted symbols.

Examples for adding a wait time for dynamic scheduling are described herein. In examples that may extend examples described herein above, the WTRU may start a timer, such as timer $T_{flush}$, for example, before the WTRU toggles an NDI. Additionally or alternatively, the WTRU may start a timer before the WTRU considers having to toggle NDI. Additionally or alternatively the WTRU may consider NDI toggling when the timer expires.

In another example, the WTRU may be configured to monitor a PDCCH for DCI, such as a group-common DCI, indicating an overload indication, for example, according to a specific DCI format. Such an overload indication may indicate a resource in the time and/or frequency domain. Further, such an indication may comprise a bitmap where each bit represents a specific time/frequency resource from a time/frequency region configured by higher layers. Upon reception of the overload indication indicating a resource that overlaps with a PUSCH transmission, the WTRU may determine that the transmission is not incremented for the corresponding TB or HARQ process. The overload indication may be received before, during or after the PUSCH transmission.

Examples for the selection of a different configured grant than that of the initial HARQ transmission for the TB are described herein. In one example, the WTRU may perform a HARQ retransmission using a different configured grant than for the initial transmission of a TB. The WTRU may perform a HARQ retransmission in such manner when additional transmission opportunities may be useful, for example, to meet a specific latency/delay budget, for time critical data. The WTRU may select a grant that leads to the same TB size as that of the initial transmission for the TB. The WTRU may perform such procedure for a TB that includes data of a specific, for example, higher, priority, using grants associated to similar priority, using a second grant that is of at least equal or higher priority as that of the grant for the initial HARQ transmission of the TB, if the second grant would have been otherwise unused, there is no other data available for transmissions, and/or if there is no data of higher priority than data included in the TB transmitted using the first grant that would have otherwise been transmitted using the second grant. Such a procedure may be used only if channel mappings and restrictions would have otherwise allowed transmission of the data included in the TB using the second grant.

Examples for the selection of a different configured grant (CG) based on meeting a target operating point within a given latency are described herein. In one example, the WTRU may perform a HARQ retransmission using a different CG than for the initial transmission of a TB. The WTRU may select such a grant as a function of the target operating point for the HARQ process/TB. For example, the WTRU may select a second CG that occurs first in time and/or that enables meeting the target operating point within the desired target latency. For example, the WTRU may select a second CG only if the WTRU determines that it may not reach the target latency otherwise. For example, for example, the WTRU may make this selection if there are no other transmission opportunities for the TB using the first grant within the target latency and the target HARQ operating point is not met. For further example, the WTRU may select a second grant as a function of the properties of the second grant enabling the WTRU to meet the target HARQ operating point and/or within the target latency. In examples, the properties may include one or more of MCS, next transmission occasions, power boosting, and the like.

Examples for per-repetition selection of grant and HARQ process are described herein. In some examples, the WTRU may receive at least one grant overlapping at least in the time domain with at least one PUSCH repetition. Each of the at least one grant may be a CG or a dynamic grant. When there is overlap in the time domain between repetitions of at least two grants, the WTRU may select one of the at least two grants and may select a HARQ process. The WTRU may select a different grant and different HARQ process for a subsequent repetition, as illustrated herein below.

Figure 2:
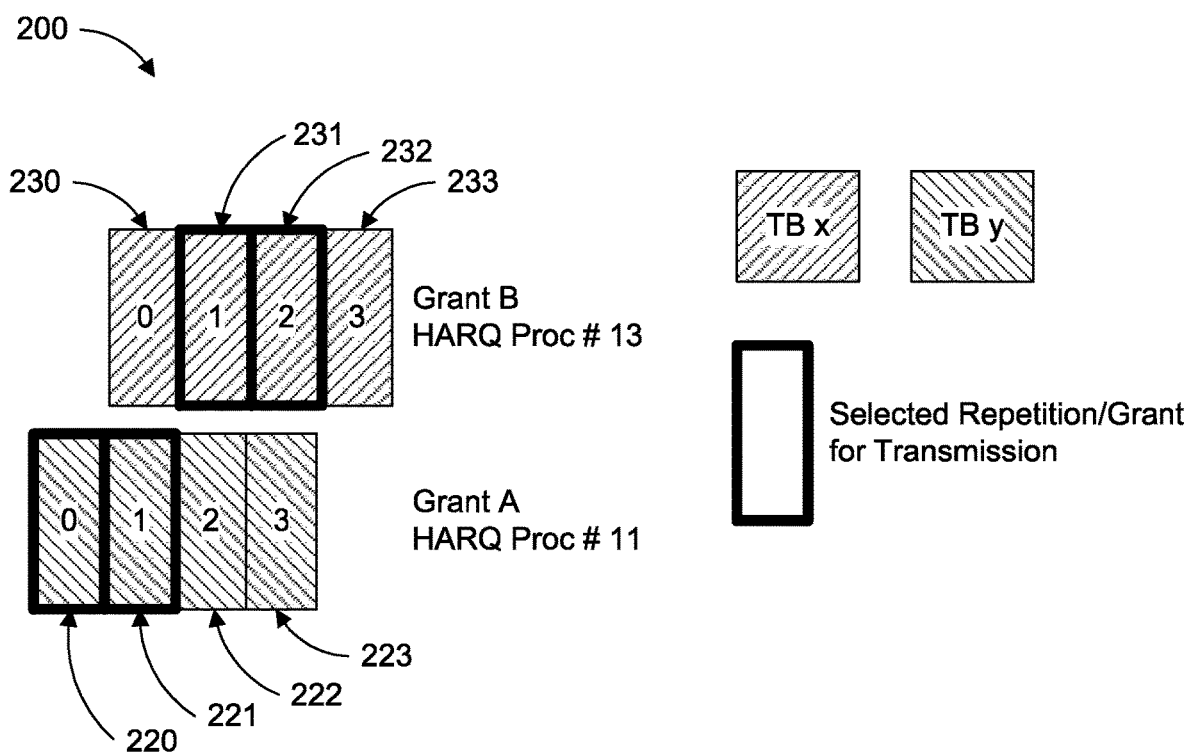
FIG. 2 is a diagram illustrating an example selection of a redundancy version (RV) according to a time occasion used for transmission.

FIG. 2 is a transmission diagram illustrating an example selection of a redundancy version (RV) according to a time occasion used for transmission. In one example, the WTRU might be configured with a RV sequence per CG. The WTRU may select the RV according to the time occasion used for transmission, as illustrated in an example shown in transmission diagram 200. The WTRU may instead select the RV assuming the first RV selection in the configured sequence, even if the selected CG occasion does not correspond to the first occasion in a bundle.

In an example, shown in FIG. 2, a WTRU may be configured with a grant A for TB y with HARQ process number 11. TB y may use transmission occasions 220, 221, 222 and 223, per grant A. Grant A may be a CG or a dynamic grant, in examples. Further, the WTRU may be configured with a grant B for TB x with HARQ process number 13. TB x may use transmission occasions 230, 231, 232 and 234, per grant B. In examples, grant B may be a CG or a dynamic grant. For the transmissions configured by grant A, the WTRU may select an RV according to the time occasion used for transmission. Accordingly, the WTRU may select an RV providing that transmission occasion 221 will include repetition for a PUSCH repetition of the transmission in transmission occasion 220.

For the transmissions configured by grant B, the WTRU may select an RV that does not correspond to the RV selection made under grant A. In this way, the WTRU may select a transmission occasion for repetition that does not correspond to the first occasion in a bundle. As a result, the WTRU may not select transmission occasion 230, the first occasion in the bundle, for repetition. Instead, the WTRU may select an RV providing that transmission occasion 232 will include repetition for a PUSCH repetition of the transmission in transmission occasion 231. As seen in FIG. 2, transmission occasions 231 and 232 do not correspond to transmission occasions 231 and 232. In this way, WTRU may select a different grant and different HARQ process for a subsequent repetition.

Examples for determining a set of possible HARQ processes for each grant are described herein. In some examples, the WTRU may transmit for one of a set of possible HARQ processes for each grant. The set of possible HARQ processes for a grant may be determined according to at least one of the following examples: explicit signaling by RRC signaling or MAC CE; indication by DCI; and timing of the PUSCH transmission. The explicit signaling may include an indication or indication information.

With respect to the explicit signaling by RRC signaling or MAC CE, in case of CG transmission, a WTRU may be configured with a set of HARQ processes that are associated with a PUSCH occasion. For example, a configured grant type 1 RRC configuration may include a list of HARQ processes for each transmission occasion. In another example, a first transmission opportunity in system frame number (SFN) 0 may be associated with a list of HARQ processes and then the subsequent opportunities are associated with a function of the list of HARQ processes of the first opportunity.

With respect to the indication by DCI, DCI may indicate a set of HARQ processes applicable for a dynamic grant or configured grant type 2. In the example case of configured grant type 2, the DCI activating the grant may carry the HARQ processes indication. The indication may be a field in DCI indicating the applicable HARQ processes. Such a field may be mapped to a set of pre-configured table of values, or alternatively or additionally, indicating the exact values of HARQ processes.

With respect to the timing of the PUSCH transmission, a HARQ process applicable to a PUSCH transmission for a specific grant may be periodic in time. Additionally or alternatively, the HARQ process applicable to a PUSCH transmission for a specific grant may be obtained from a formula.

The set of possible HARQ processes for a grant may be determined according to at least one property of the grant, such as listed in examples provided herein. Each of the one or more properties of the grant may be used alone or in any combination with each other.

Examples for selection of HARQ process are described herein. In some examples, a WTRU may be configured to select from a set of possible HARQ processes, for example, as described elsewhere herein, for at least one grant according to at least one of the following examples: based on the characteristics of the transmission and/or based on accumulated repetitions/energy.

For example, in case that a WTRU selects a set of possible HARQ processes based on the characteristics of the transmission, the WTRU may be pre-configured with HARQ process IDs that may be used for high reliability transmission. In another example, a WTRU may be pre-configured with HARQ process IDs that may be used for high priority transmission. When a WTRU selects the HARQ process for a grant, a WTRU may consider the intersection between the possible set of HARQ processes and the HARQ processes related to the characteristics of the transmission.

Examples for the selection of a set of possible HARQ processes based on accumulated repetitions/energy are described herein. In an example, the WTRU may select a HARQ process that had the fewest number of or least transmissions. In another example, the WTRU may select a HARQ process that had the greatest number of or most transmissions. In a further example, the WTRU may select a HARQ process that had the least latency. In an additional example, the WTRU may select a HARQ process that had the most latency. In examples, latency may be considered to be the time since the first TB transmission. Also, the WTRU may select a HARQ process that had the greatest priority in a priority order. Additionally, the WTRU may select a HARQ process that had the lowest priority in a priority order. In examples, the priority order may be pre-defined or may be pre-configured. Further, the WTRU may select a HARQ process in additional like ways.

In another example, the WTRU may select a TB based on time in a HARQ process identity (PID) buffer. In a further example, the WTRU may select a TB based on time since NDI toggling.

To improve coverage, the variance in terms of number of TB retransmissions/repetitions, in other words, the total number of transmissions for a given TB, per available HARQ process IDs may need to be minimized for the HARQ process(es) in use. This is because a single block may be split over multiple TBs sent on different HARQ processes, and thus the overall BLER is dictated by the TB with least amount of accumulated energy at the receiver. For example, if 1% of the TBs have only 2 transmissions while remaining TBs of the block have a higher number of repetitions/transmissions, the resulting BLER may be dictated by the 1% of transmissions that do not have enough accumulated energy.

The WTRU may use means to reduce the variance in terms of number of accumulated repetitions/retransmissions between the HARQ processes in use. In examples provided herein the repetitions/retransmissions may collectively be described as transmissions. When multiple UL grants are available for transmission for different HARQ process IDs at a certain transmission occasion, for example, overlapping the CGs, the WTRU may select or prioritize the grant/HARQ process that has the least number of transmissions/repetitions. In one example, the WTRU may rank HARQ processes in the given transmission occasion in ascending order of number of transmissions/repetitions. Further, the WTRU may select/prioritize the HARQ process with the highest ranks, in other words, the lowest number of repetitions. In another example, the WTRU may rank HARQ processes in the given transmission occasion in descending order of elapsed time since the respective TB has been stored in the HARQ process buffer. Also, the WTRU may select/prioritize the HARQ process with the highest rank, in other words, the process with a TB that has been stored the longest compared to other processes. In another example, when the SFI overrides a previously configured uplink slot to be a downlink slot, the WTRU may prioritize the selection of HARQ processes in the overridden slots for transmission at the next possible uplink transmission occasion. The WTRU may prioritize HARQ processes for which the number of accumulated TB transmissions is less than a configured threshold.

Further, the WTRU may consider the value of the CG timer values for the HARQ processes in use. For example, the WTRU may prioritize the selection of HARQ process IDs with the timer about approaching expiry (for example, if the timer value is less than a configured threshold and has not expired), possibly if the number of accumulated repetitions/transmission for the TB is lower than a configured threshold. In another example, the WTRU may filter HARQ processes from selection if the CG timer value is larger than a certain threshold and/or the number of accumulated transmissions is larger than a certain threshold. In another example, the CG timer can be configured to govern the total time the TB is stored in the buffer including all retransmissions, whereby the timer is not reset for retransmissions. The WTRU may prioritize the selection of HARQ processes, for example, GS, that have the highest CG transmission timer value, possibly divided by the periodicity in an example. In another example, the WTRU may use a different timer that (re)-starts upon each TB (re)-transmission or upon the initial transmission, whereby the WTRU selects the HARQ process with lowest timer value. The WTRU may stop such timer once a certain number of TB transmissions have been accumulated. In an example, the number of TB transmissions at which the WTRU stops may be predetermined.

Examples for predetermined HARQ process ID selection for CGs are described herein. In one example, the WTRU may determine the PID for time division duplex (TDD) as a function of non-uplink slots, instead of using a formula based on any type of slot.

Figure 3:
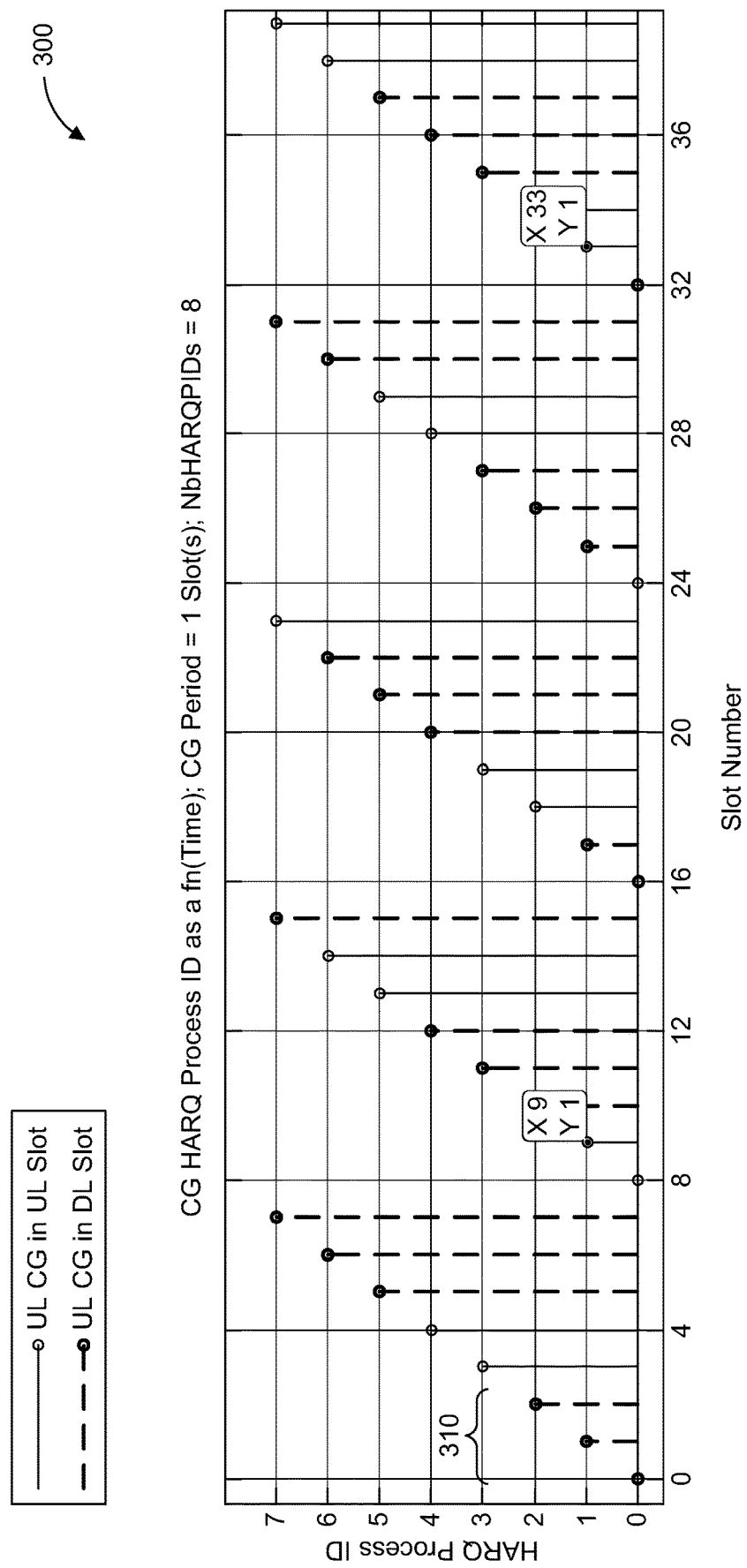
FIG. 3 is a diagram illustrating an example of hybrid automatic repeat request (HARQ) process identifier (ID) selection.

FIG. 3 is a diagram illustrating an example of HARQ process ID selection. The examples shown in diagram 300 may be used in any combination of other embodiments described herein. In NR systems, a HARQ process ID for a new transmission on a CG may be determined by a formula that considers the time occasion in which the transmission is made:

$$\text{HARQ Process ID} = [\text{floor}(\text{CURRENT\_symbol}/\text{periodicity})] \text{ modulo nrofHARQ-Processes} \quad \text{Equation (1)}$$

where CURRENT_symbol=(SFN×numberOfSlotsPerFrame×numberOfSymbolsPerSlot+slot number in the frame×numberOfSymbolsPerSlot+symbol number in the slot).

This results in uniformly distributing the HARQ process IDs in the time domain, while maintaining a common understanding between the network and the WTRU regarding the HARQ process ID used. In an example, there is no ambiguity on which process ID was selected as the process ID is a function of synchronization and the timing of the starting symbol. Such uniform time domain distribution, however, may not consider slots in which uplink transmissions cannot be transmitted. Such slots may include, for example, slots part of the downlink portion of a TDD frame, slots preempted by downlink transmission or slots dynamically indicated as downlink.

Using the HARQ PID formula, an example in FIG. 3 illustrates how the WTRU determines the HARQ process ID for a CG with the following configurations. Specifically, the configurations may include a CG HARQ PID selection over a period of 50 ms, using the formula). Further, a CG periodicity of 1 slot may be applied. Also, a maximum of 8 HARQ processes may be included in the configuration. In addition, the configuration may apply over a period of 5 frames, with 50 ms using 15 kHz subcarrier spacing. Also, the configuration may include a TDD frame split of slots as follows, in an example: [D, D, D, U, U, D, D, D, U, U]. In another example, a slot may be split into symbols in a like pattern, as follows: [D, D, D, U, U, D, D, D, U, U].

As shown in an example illustrated in FIG. 3, for this given TDD frame split, a HARQ process ID repeats itself once every 24 ms. This may be a considerable delay for the purpose of repeating the TB. The delay can be even larger if there are fewer UL slots within the TDD frame. Furthermore, an example shown in FIG. 3. illustrates the inefficiency of uniformly spreading HARQ process IDs over time when some slots are downlink only or not valid for CG uplink transmission. As illustrated, it takes 24 ms to use all available HARQ processes, though 10 uplink slots have elapsed already. In slot 19, the formula may yield selecting a HARQ process ID that has already occurred, such as in slot 3, though HARQ process 7 has not been used so far and is sitting IDLE for uplink. This can result in a reduction in the overall TDD uplink data rate, especially in certain TDD frame split configurations.

Under an example shown in FIG. 3, the downlink slots or slots in which CG uplink transmission is not possible may be included in the HARQ process ID formula provided in Equation (1). Accordingly, the first three slots 310 may be downlink and are included in the HARQ process ID formula, preventing HARQ process IDs 0, 1, and 2 from being used for uplink transmission until slot 10 for HARQ process ID 1, slot 16 for HARQ process ID 0 and slot 17 for HARQ process ID 1. Such a delay until slot 16 for HARQ process ID assignment may result in a reduction in the overall TDD uplink data rate.

Embodiments and examples for downlink-aware HARQ PID selection are described herein. A downlink-aware HARQ PID selection may be considered to be a modification of the examples shown in FIG. 3.

Figure 4:
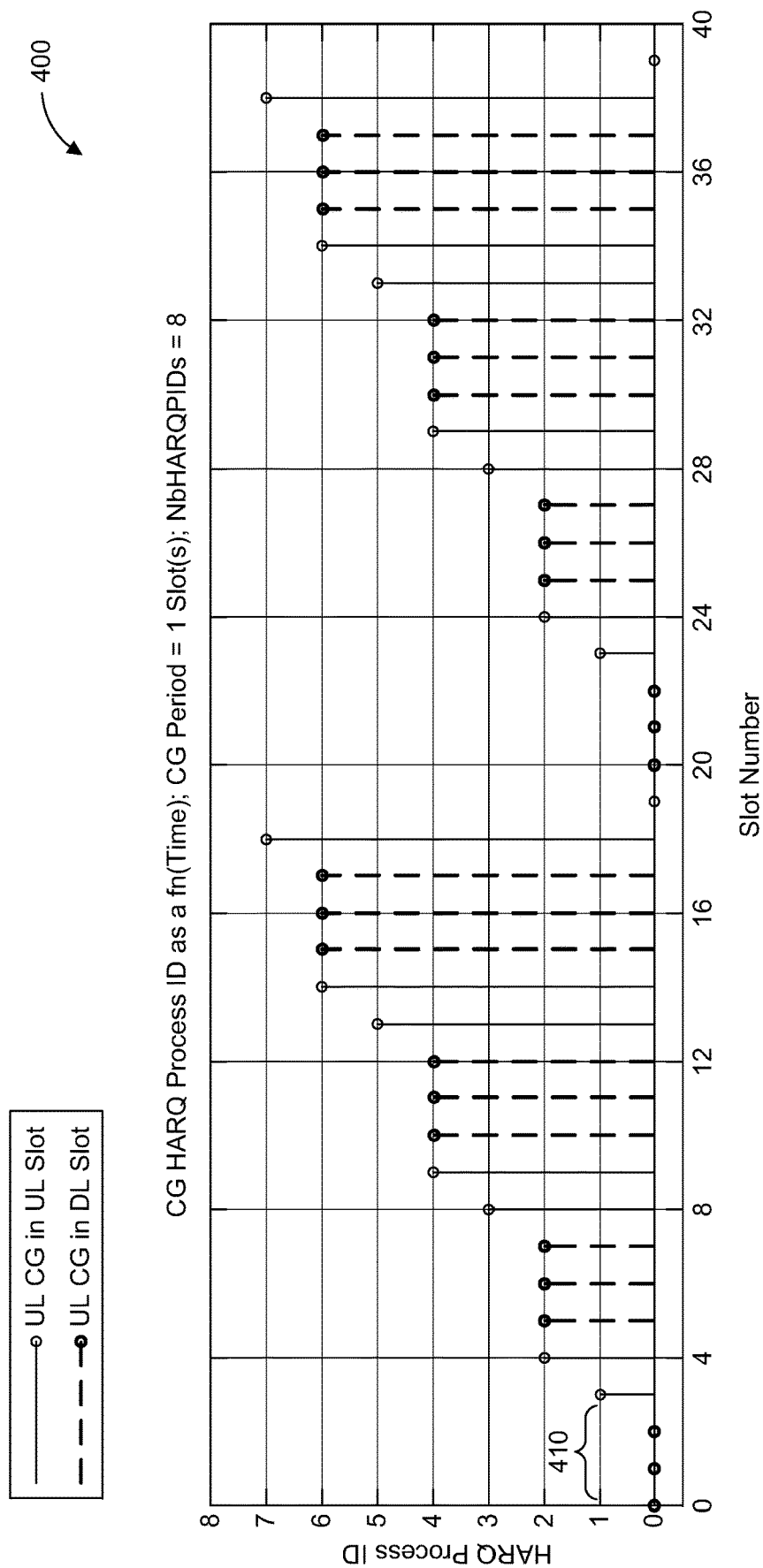
FIG. 4 is a diagram illustrating another example HARQ process ID selection.

FIG. 4 illustrates another example HARQ process ID selection. The examples shown in diagram 400 may be used in any combination of other embodiments described herein. In one example, the WTRU may use an alternative formula for selecting a HARQ process ID for a CG. For example, the WTRU may exclude downlink slots or slots in which CG uplink transmission is not possible from the formula. For example, the WTRU can use a formula for HARQ PID selection as in Equation (1), above, but with the following variables: Where CURRENT_symbol=SFN×(numberOfSlotsPerFrame−numberOfDownlinkSlotsPerFrame)×numberOfSymbolsPerSlot+(slot number in the frame−number of past downlink slots in the frame)×numberOfSymbolsPerSlot+symbol number in the slot.

In examples, the "numberOfDownlinkSlotsPerFrame" may be the number of known downlink slots per frame, for example, either configured or indicated to the WTRU, or determined by the WTRU. The "number of past downlink slots in the frame" may be the number of downlink slots that have already occurred in the current frame. The WTRU can determine this number from semi-static configurations or by receiving dynamic indication/signaling about whether a past slot is uplink or downlink.

Examples shown in FIG. 4 illustrate HARQ Process ID selection based on the formula in Equation (1) for the same configuration parameters given in the examples illustrated in FIG. 3. Specifically, the examples shown in both FIGS. 3 and 4 may use CG HARQ PID selection over a period of 50 ms in Equation (1).

Under an example in FIG. 4, the downlink slots or slots in which CG uplink transmission is not possible are not included in the HARQ process ID formula provided in Equation (1). Accordingly, the first three slots 410 are downlink but are not included in the HARQ process ID formula, preserving HARQ process IDs 0, 1, and 2 to be used for uplink transmission. In this way, downlink slots are not provided with their own HARQ process ID. Accordingly, the first UL slot, shown as slot 3, is provided with HARQ process ID 1. Such an early provision of HARQ process ID 1 occurs earlier than the UL provision for HARQ process ID 1 in the examples shown in FIG. 3. Further, a complete assignment of HARQ process IDs for UL transmission occurs by slot 18 in the examples shown in FIG. 4 as compared with waiting until slot 23 for a complete assignment, as in the examples in FIG. 3. As a result, the assignment of HARQ process IDs for UL transmission is more efficient in the examples shown in FIG. 4 than in the examples shown in FIG. 3.

Examples for dynamic overriding/indication of a downlink slot are described herein. In one example, the WTRU may determine whether a slot is applicable for uplink transmission, for example, using a CG, from dynamic indication proved by the gNB, in addition to semi-static UL/DL frame split configuration. The WTRU may receive such an indication implicitly or explicitly by signaling means. For example, the WTRU may receive DCI or MAC CE signaling indicating whether the current or a future slot/subframe is applicable for uplink transmission. This indication may override an already configured slot for uplink transmission. In another example, the WTRU may receive a DL or UL preemption indication for the current slot or a future slot, which the WTRU may consider as a dynamic indication for a slot not applicable for uplink transmission.

Upon receiving such dynamic indication or determining that a slot is not applicable for uplink transmission, the WTRU may exclude such slots from the process determining the HARQ process ID. For example, the WTRU may count indicated slots for downlink part of "number of past downlink slots in the frame" in the HARQ PID selection formula in Equation (1) described in FIG. 4.

The WTRU may repeat an uplink TB transmission across multiple slots that are interrupted by a downlink portion or over uplink slots with DL slots in-between. For slots after the downlink portion, the WTRU may select the same HARQ process ID selected prior to the downlink portion to continue the transmission of the remaining repetitions.

Examples for a guaranteed repetition scheme are described herein. For TDD, a PUSCH repetition may be omitted if it overlaps with at least one downlink symbol. For PUSCH repetition type A, the configured number of repetitions, repK, may include repetitions that are transmitted and repetitions that are omitted because of such overlap. This means that the number of repetitions that are transmitted may be lower than repK.

For example, in the TDD frame split of [D, D, D, U, U, D, D, D, U, U, D, D, D, U, U], when a WTRU is configured with repK=8, the WTRU may determine to increase the repetition counter over any slots and attempt to perform repetitions in uplink slots during the following sequence of slots [U, U, D, D, D, U, U, D]. Since the WTRU transmits the repetition on uplink slots only, in this example, the WTRU may transmit repetition over 4 uplink slots.

In some examples, the WTRU may be configured to perform repetitions according to a guaranteed repetition scheme. In such a scheme, the number of repetitions, repK, may include repetitions that are transmitted and not repetitions that are omitted because of overlap with downlink symbols. Using this approach, the number of repetitions that are transmitted may be equal to repK. When the WTRU performs repK guaranteed repetitions, the WTRU may increment a repetition counter when a PUSCH transmission is not omitted due to the overlap with downlink symbol(s). Thus, for example, the WTRU may perform repetition over 8 uplink slots if repK=8 is configured. Such type of guaranteed repetition scheme may be applicable at least to PUSCH repetition type A.

At least when PUSCH repetition type B is configured, a WTRU configured to perform repetition according to a guaranteed repetition scheme and a number of nominal repetitions K may perform PUSCH repetitions until the total number of time symbols over actual PUSCH repetitions that are transmitted is equal to K times the configured duration of a nominal repetition. To achieve this, the WTRU may perform PUSCH repetitions using rules applicable to PUSCH repetition type B using an adjusted number of nominal repetitions K', where K' may be larger than or equal to K.

Aforementioned configurations herein may allow flexibility in repetition and reliable communication can be established between the WTRU and network at low latency. Such flexibility and lower latency may increase efficiency in communication.

Examples for signaling of a repetition scheme are described herein. In some examples, the WTRU may receive an explicit indication from the network, for example, a base station, regarding whether to perform repetitions according to a guaranteed repetition scheme. The WTRU may receive the aforementioned indication, for example, in RRC signaling, a MAC-CE and/or DCI. For example, the PUSCH configuration or a configured grant configuration may include an information element indicating whether to apply a guaranteed repetition scheme. If a MAC-CE is used as an explicit indication, the WTRU may receive a MAC-CE which includes a CG ID or a HARQ sequence ID corresponding to the transmission with repetitions. In another example, RRC signaling may configure whether to use a guaranteed repetition scheme for each value of a time domain resource allocation (TDRA) table. Upon receiving DCI, the WTRU may determine whether to apply the guaranteed repetition scheme from the value of the TDRA field of the DCI.

Alternatively or additionally, the WTRU may determine how to increment the repetition counter based on the predefined condition. In some embodiments, if separation of uplink slots is above the predetermined threshold, the WTRU may determine to apply a guaranteed repetition scheme. The WTRU may be configured with the predetermined threshold by RRC signaling, a MAC-CE or DCI. For example, in a TDD frame split of [D, D, D, S, U, D, D, D, S, U], uplink slots are separated 4 slots comprising 3 downlink slots and 1 special slot, where the special slot may include at least uplink and downlink symbols. The special slot may include flexible symbols. The WTRU may determine whether the number of slots between uplink slots is above the predetermined threshold and determine how to increment the counter. The WTRU may choose to increment the counter: (1) only when it encounters an uplink slot; or (2) when it encounters a downlink slot, a special or an uplink slot.

The threshold for separation in terms of number of slots may be applicable to the separation between groups of uplink slots. For example, in another TDD frame split, [D, D, D, U, U, D, D, D, U, U], groups of uplink slots, where each group comprises 2 uplink slots, are separated by 3 downlink slots. The WTRU may determine whether the number of slots that separate groups of uplink slots is above the predetermined threshold and determine how to increment the repetition counter.

The threshold for separation may be defined in terms of the number of symbols. The WTRU may choose to increment the counter when it encounters an uplink symbol, downlink symbol or flexible symbol.

Figure 5A:
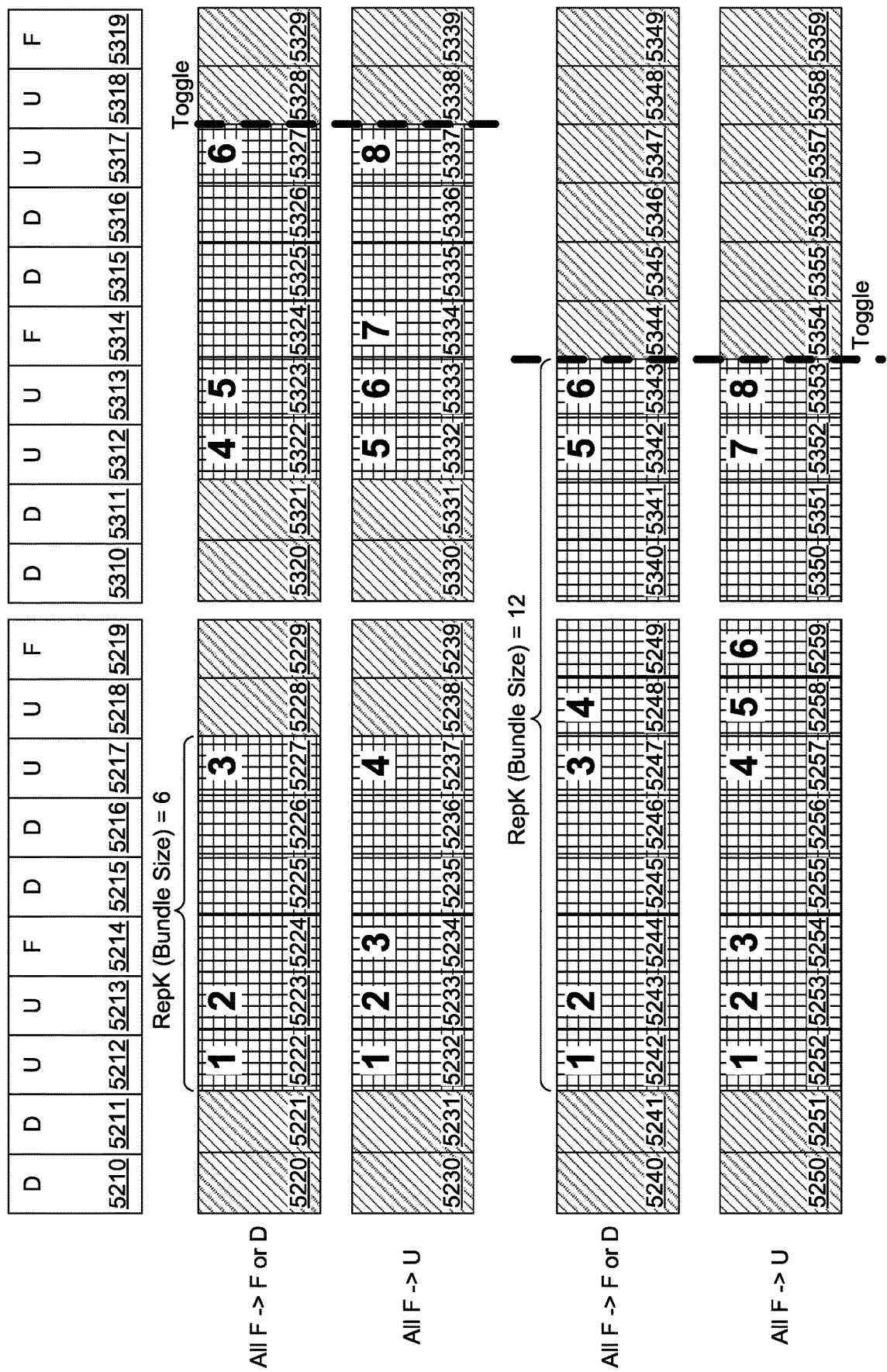
FIG. 5A is a diagram illustrating examples of retransmission of a transport block (TB) and toggling a new data indicator (NDI)

FIG. 5A is a diagram illustrating examples of retransmission of a TB and toggling an NDI. In an example shown in FIG. 5A, slot assignments for a first frame are shown including slots 5210 through 5219 and slot assignments for a second frame are shown, include slots 5310 through 5319. In examples, slots 5210, 5211, 5215 and 5216 of the first frame and slots 5310, 5311, 5315 and 5316 of the second frame may be assigned as downlink slots for a WTRU. Further, slots 5212, 5213, 5217 and 5218 of the first frame and slots 5312, 5313, 5317 and 5318 of the second frame may be assigned as uplink slots. In addition, slots 5214 and 5219 of the first frame and slots 5314 and 5319 of the second frame may be assigned as flexible slots. In examples provided herein, six repetitions may be needed to meet a BLER target.

In an example shown in FIG. 5A, the assignments provided herein above may be applied for transmission of a TB. In this example, a repetition bundle of size six may be used and all flexible slots may be used for downlink or remain flexible. Specifically, the assignments above may be applied to a first frame, including slots 5220 through 5229, and a second frame, including slots 5320 through 5329, but all slots assigned as flexible slots may be used for downlink transmissions or may remain flexible in these frames. As a result, such flexible or downlink slots may not be used for uplink transmission. Accordingly, slots 5222, 5223, 5227, 5228, 5322, 5323, 5327 and 5328 may be used for uplink transmission. However, slots 5220, 5221, 5224, 5225, 5226, 5229, 5320, 5321, 5324, 5325, 5326 and 5329 may not be used for uplink transmission. As stated, six repetitions may be needed to meet a BLER target. Further, a repetition bundle size may be set at six. Also, a RepK may be six, in an example. Further, an NDI may be toggled by the WTRU based on a timer, at the end of two bundles. Accordingly, the timer may be set to expire after slot 5327.

As shown in an example in FIG. 5A, the first uplink transmission of a TB, shown as transmission 1, which may be a first uplink transmission of a repetition of the TB or a first uplink transmission of a TB repetition, may occur in slot 5222. This uplink transmission in slot 5222 may begin a repetition bundle of size six, which may accordingly end in slot 5227. A repetition, shown as transmission 2, may occur in slot 5223, which is the next available uplink slot. Another repetition may not be transmitted on the uplink in slot 5224 as that flexible slot has not been re-assigned or indicated as an uplink slot. Similarly, another repetition may not be transmitted on the uplink in slots 5225 and 5226 as those slots have been assigned as downlink slots and not uplink slots. Another repetition, shown as transmission 3, may be transmitted on the uplink in slot 5227 as that slot has been assigned as an uplink slot. However, a repetition after that may not be transmitted in slot 5228, even though that slot has been assigned as an uplink slot, because the repetition bundle ended in a slot 5227. Therefore, further uplink transmissions of repetitions must wait for a new bundle. Further, the new bundle may be transmitted when a new uplink slot for the same HARQ PID becomes available. In an example, slot 5228 may correspond to a different HARQ PID and may not be used for further uplink transmissions of a repetition of the TB.

Accordingly, the next repetition bundle, shown as transmission 4, may be transmitted on the uplink in slot 5322, since that is the first uplink slot available, after downlink slots 5320 and 5321. This uplink transmission 4 in slot 5322 may begin a second repetition bundle of size six, which may accordingly end in slot 5327. In an example, the second repetition bundle may begin in slot 5327 because that slot may be the first available uplink slot for the same HARQ PID as the first repetition bundle. Further, another repetition, shown as transmission 5, may be transmitted on the uplink in slot 5323, as that slot has been assigned as an uplink slot. After transmission 5, another repetition may not be transmitted on the uplink in slot 5324 as that slot has not been assigned or indicated as an uplink slot. Similarly, another repetition may not be transmitted on the uplink in slots 5325 and 5326 as those slots have been assigned as downlink slots and not uplink slots. Another, final, repetition, shown as transmission 6, may be transmitted on the uplink in slot 5327 as that slot has been assigned as an uplink slot. Slot 5327 may also end the second repetition bundle. The WTRU may then toggle an NDI based on the expiration of the NDI timer since the configured grant timer has expired for the associated HARQ process. Moreover, uplink slot 5328 is not used since the WTRU has toggled the NDI. Further, slot 5329 is not available for uplink transmission as a flexible or downlink slot. In this example, while the six repetition BLER target was met, eighteen slots and almost two entire frames were required to transmit the TB. Accordingly, this example may be considered to be a very conservative setting of the timer. In comparison to other example cases provided below herein, this example may be considered to be setting the timer to accommodate a worst case possibility. In this way, this approach may be considered to be an inefficient approach to toggling an NDI, in comparison with other examples provided herein.

In another example shown in FIG. 5A, the assignments provided herein above may be applied for TB transmission where a repetition bundle of size six is used and flexible slots are re-assigned or indicated as uplink slots. Specifically, the slot assignments provided herein above may be applied for TB transmission to a first frame, including slots 5230 through 5239, and a second frame, including slots 5330 through 5339, but all slots assigned as flexible slots may be used for uplink transmissions in these frames.

Accordingly, slots 5232, 5233, 5234, 5237, 5238, 5239, 5332, 5333, 5334, 5337, 5338 and 5339 may be used for uplink transmission. However, slots 5230, 5231, 5235, 5236, 5330, 5331, 5335 and 5336 may not be used for uplink transmission. In examples provided herein, six repetitions may be needed to meet a BLER target. Further, a repetition bundle size may be set at six. Also, a RepK may be six, in an example. Further, an NDI may be toggled by the WTRU based on a timer, at the end of two bundles. Accordingly, the timer may be set to expire after slot 5337.

As shown in an example in FIG. 5A, the first uplink transmission of a TB, which may be a first uplink transmission of a TB repetition, may occur in slot 5232. This uplink transmission in slot 5232 may begin a repetition bundle of size six, which may accordingly end in slot 5237. A repetition, shown as transmission 2, may occur in slot 5233, which is the next available uplink slot. Another repetition, shown as transmission 3, may be transmitted on the uplink in slot 5234 as that previously flexible slot has been re-assigned or indicated as an uplink slot. However, another repetition may not be transmitted on the uplink in slots 5235 and 5236 as those slots have been assigned as downlink slots and not uplink slots. Another repetition, shown as transmission 4, may be transmitted on the uplink in slot 5237 as that slot has been assigned as an uplink slot. However, a repetition after that may not be transmitted in slot 5238, even though that slot has been assigned as an uplink slot, because the repetition bundle ended in slot 5237. Similarly, a repetition may not be transmitted in slot 5239, even though that slot has been re-assigned or indicated from a flexible slot to an uplink slot because the repetition bundle has ended. Therefore, further repetitions of uplink transmission must wait for a new bundle. Further, the new bundle may be transmitted when a new uplink slot for the same HARQ PID becomes available. In an example, slots 5238 and 5239 may correspond to a different HARQ PID and may not be used for further uplink transmissions of a repetition of the TB.

Accordingly, the next repetition bundle, shown as transmission 5, may be transmitted on the uplink in slot 5332, since that is the first uplink slot available, after downlink slots 5330 and 5331. This uplink transmission 5 in slot 5332 may begin a second repetition bundle of size six, which may accordingly end in slot 5337. Further, another repetition, shown as transmission 6, may be transmitted on the uplink in slot 5333, as that slot has been assigned as an uplink slot. At transmission 6, the transmission of the TB has now reached the six repetitions required for meet the BLER target. However, since uplink slots remain in the current repetition bundle, further repetition transmission may be made. Accordingly, after transmission 7, another repetition may be transmitted on the uplink in slot 5334 as that slot has been assigned as an uplink slot. However, another repetition may not be transmitted on the uplink in slots 5335 and 5336 as those slots have been assigned as downlink slots and not uplink slots. Another, final, repetition, shown as transmission 8, may be transmitted on the uplink in slot 5337 as that slot has been assigned as an uplink slot. Slot 5337 may also end the second repetition bundle. The WTRU may then toggle an NDI based on the expiration of the NDI timer since the CG timer has expired for the associated HARQ process. Moreover, uplink slot 5338 is not used since the WTRU has toggled the NDI. Further, slot 5339 is available for uplink transmission as a previously flexible slot which has been re-assigned or indicated as an uplink slot, but slot 5339 is similarly not used since the WTRU has toggled the NDI.

In this example provided by slots 5230 through 5239 and 5330 through 5339, the TB has been successfully transmitted with the six repetitions required to meet the BLER target. However, extra repetition transmissions, such as repetition transmission 7 on slot 5334 and repetition transmission 8 on slot 5337, were made as the WTRU waited for the expiration of the timer before the WTRU toggled the NDI. Further, the delay in toggling the NDI after the transmission of six repetitions created a wait before the next TB could be transmitted. Accordingly, this example provided by slots 5230 through 5239 and 5330 through 5339 may be seen as relatively less efficient than other solutions provided further below herein.

In another example shown in FIG. 5A, the assignments provided herein above may be applied for TB transmission where a repetition bundle of size twelve is used and flexible slots are re-assigned or indicated as downlink slots or remain as flexible slots. Specifically, the slot assignments provided herein above may be applied for TB transmission to a first frame, including slots 5240 through 5249, and a second frame, including slots 5340 through 5349, but all slots assigned as flexible slots may be used for downlink transmissions or may remain flexible in these frames.

As a result, such flexible or downlink slots may not be used for uplink transmission. Accordingly, slots 5242, 5243, 5247, 5248, 5342, 5343, 5347 and 5348 may be used for uplink transmission. However, slots 5240, 5241, 5244, 5245, 5246, 5249, 5340, 5341, 5344, 5345, 5346 and 5349 may not be used for uplink transmission. In examples provided herein, six repetitions may be needed to meet a BLER target, as seen in other examples. However, in this example, a repetition bundle size may be set at twelve. For example, a RepK may be twelve. Further, an NDI may be toggled by the WTRU based on a timer, at the end of one bundle. Accordingly, the timer may be set to expire after slot 5343.

As shown in an example in FIG. 5A, the first uplink transmission of a TB, shown as transmission 1, which may be a first uplink transmission of a TB repetition, may occur in slot 5242. This uplink transmission in slot 5242 may begin a repetition bundle of size twelve, which may accordingly end in slot 5343 in the second frame. A repetition, shown as transmission 2, may occur in slot 5243, which is the next available uplink slot. Another repetition may not be transmitted on the uplink in slot 5244 as that originally assigned flexible slot has not been re-assigned or indicated as an uplink slot. Similarly, another repetition may not be transmitted on the uplink in slots 5245 and 5246 as those slots have been assigned as downlink slots and not uplink slots. Another repetition, shown as transmission 3, may be transmitted on the uplink in slot 5247 as that slot has been assigned as an uplink slot. Further, yet another repetition, shown as transmission 4, may be transmitted on the uplink in slot 5248 as that slot has been assigned as an uplink slot and is within the bundle of size twelve. However, the next repetition may not be transmitted on the uplink in slot 5249 as that originally assigned flexible slot has not been re-assigned or indicated as an uplink slot.

The repetition bundle may continue in the second frame in slots 5340 and 5341, but no repetition transmission may be made in these slots because they have been assigned as downlink slots. Further repetitions, shown as transmission 5 and transmission 6, the final repetition, may be transmitted on the uplink in slots 5342 and 5343, respectively, as those slots have been assigned as uplink slots. Slot 5343 may also end the repetition bundle of size twelve. Accordingly, the WTRU may then toggle an NDI based on the expiration of the NDI timer since the CG timer has expired for the associated HARQ process. Moreover, uplink slots 5347 and 5348 are not used since the WTRU has toggled the NDI. Further, slots 5344, 5345, 5346, and 5349 are not available for uplink transmission as each is a flexible slot or a downlink slot. This example with a repetition bundle of size twelve may be considered to be more efficient than earlier examples herein with repetition bundles of size six, because the transmission of the TB is completed after fourteen slots instead of eighteen slots, as can be seen in FIG. 5A.

In another example shown in FIG. 5A, the assignments provided herein above may be applied for TB transmission where a repetition bundle of size twelve is used and flexible slots are re-assigned or indicated as uplink slots. Specifically, the slot assignments provided herein above may be applied for TB transmission to a first frame, including slots 5250 through 5259, and a second frame, including slots 5350 through 5359, but all slots assigned as flexible slots may be used for uplink transmissions in these frames.

Accordingly, slots 5252, 5253, 5254, 5257, 5258, 5259, 5352, 5353, 5354, 5357, 5358 and 5359 may be used for uplink transmission. However, slots 5250, 5251, 5255, 5256, 5350, 5351, 5355 and 5356 may not be used for uplink transmission. In examples provided herein, six repetitions may be needed to meet a BLER target, as seen in other examples. Moreover, in this example, a repetition bundle size may be set at twelve. Also, a RepK may be twelve in an example. Further, an NDI may be toggled by the WTRU based on a timer, at the end of one bundle. Accordingly, the timer may be set to expire after slot 5353.

As shown in an example in FIG. 5A, the first uplink transmission of a TB, shown as transmission 1, which may be a first uplink transmission of a TB repetition, may occur in slot 5252. This uplink transmission in slot 5252 may begin a repetition bundle of size twelve, which may accordingly end in slot 5353 in the second frame. A repetition, shown as transmission 2, may occur in slot 5253, which is the next available uplink slot. Another repetition, shown as transmission 3, may be transmitted on the uplink in slot 5254 as that previously flexible slot has been re-assigned or indicated as an uplink slot. However, another repetition may not be transmitted on the uplink in slots 5255 and 5256 as those slots have been assigned as downlink slots and not uplink slots. Another repetition, shown as transmission 4, may be transmitted on the uplink in slot 5257 as that slot has been assigned as an uplink slot. Yet a further repetition, shown as transmission 5, may be transmitted on the uplink in slot 5258 as that slot has been assigned as an uplink slot and is within the bundle of size twelve. Also, yet another repetition, shown as transmission 6, may be transmitted on the uplink in slot 5259 as that previously flexible slot has been re-assigned or indicated as an uplink slot and is also within the bundle size of twelve.

The repetition bundle may continue in the second frame in slots 5350 and 5351, but no repetition transmission may be made in these slots because they have been assigned as downlink slots. Further repetitions, shown as transmission 7 and transmission 8, the final repetition, may be transmitted on the uplink in slots 5352 and 5353, respectively, as those slots have been assigned as uplink slots. Slot 5353 may also end the repetition bundle of size twelve. Accordingly, the WTRU may then toggle an NDI based on the expiration of the NDI timer. In an example, the NDI timer may expire since the CG timer has expired. Moreover, uplink slots 5357 and 5358 are not used since the WTRU has toggled the NDI. Further, slots 5354 and 5359 are available for uplink transmission as previously flexible slots which have been re-assigned or indicated as uplink slots, but slots 5354 and 5359 are similarly not used since the WTRU has toggled the NDI. Further, slots 5355 and 5356 are not available for uplink transmission as downlink slots.

This example with a repetition bundle of size twelve and all flexible slots re-assigned or indicated as uplink slots may be considered to be more efficient than earlier examples herein with repetition bundles of size six or no slot reassignment of flexible to uplink slots, because the transmission of the TB is completed after ten slots instead of fourteen or eighteen slots. Further, transmissions of repetitions of a different TB may be transmitted in upcoming uplink slots, such as slots 5357 and 5358, and re-assigned or indicated as uplink slot 5359, thus providing a higher data rate, while maintaining the HARQ operating point. However, extra repetition transmissions, such as repetition transmission 7 on slot 5352 and repetition transmission 8 on slot 5353, were made as the WTRU waited for the expiration of the timer before the WTRU toggled the NDI. Further, the delay in toggling the NDI after the transmission of six repetitions created a wait before the next TB could be transmitted. Accordingly, this example provided by frames 5250 through 5259 and 5350 through 5359 may be seen as relatively less efficient than other solutions provided further below herein, such as those example solutions that use a transmission counter.

Figure 5B:
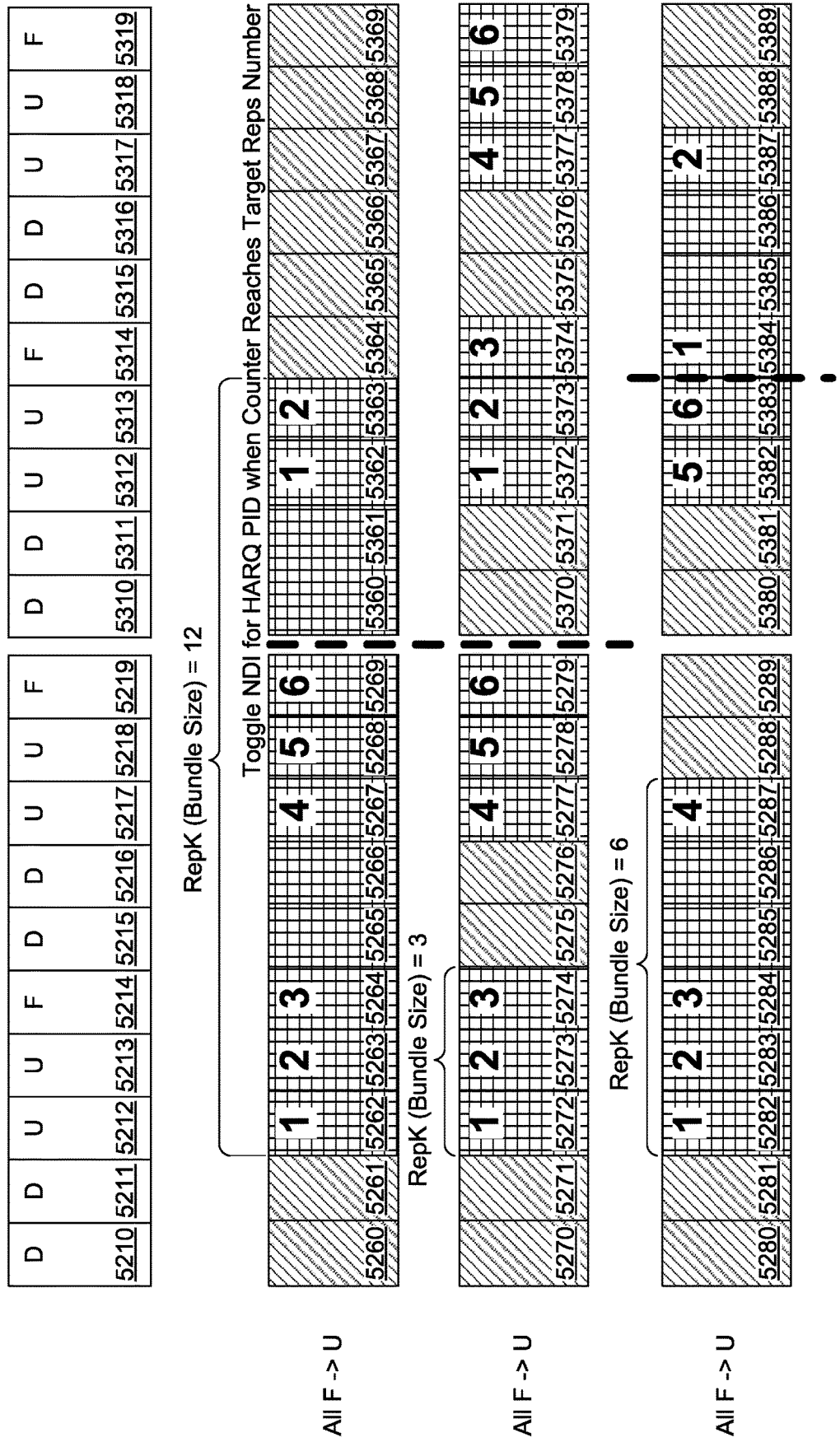
FIG. 5B is a diagram illustrating examples of retransmission of a TB and toggling an NDI when a counter reaches a target number.

FIG. 5B is a diagram illustrating examples of retransmission of a TB and toggling an NDI when a counter reaches a target number. In an example shown in FIG. 5B, the assignments provided herein above may be applied for TB transmission where a transmission counter is incremented, a repetition bundle of size twelve is used and flexible slots are re-assigned or indicated as uplink slots. Specifically, the slot assignments provided herein above may be applied for TB transmission to a first frame, including slots 5260 through 5269, and a second frame, including slots 5360 through 5369, but all slots assigned as flexible slots may be used for uplink transmissions in these frames.

Accordingly, slots 5262, 5263, 5264, 5267, 5268, 5269, 5362, 5363, 5364, 5367, 5368 and 5369 may be used for uplink transmission. However, slots 5260, 5261, 5265, 5266, 5360, 5361, 5365 and 5366 may not be used for uplink transmission. In examples provided herein, six repetitions may be needed to meet a BLER target, as seen in other examples. Further, a repetition bundle size may be set at twelve. Also, a RepK may be twelve, for example. However, in this example, a WTRU may toggle an NDI for a HARQ PID when a transmission counter reaches a target number of repetitions. The transmission counter may be configured with different target number of repetition numbers in different examples. In an example, when the repetition number needed to reach the BLER target is six, the transmission counter may be set to six. Accordingly, the WTRU may toggle the NDI for a HARQ PID when the transmission counter reaches six repetitions, which is the number of repetitions needed to meet the BLER target.

As shown in an example in FIG. 5B, the first uplink transmission of a TB, shown as transmission 1, which may be a first uplink transmission of a TB repetition, may occur in slot 5262. This uplink transmission in slot 5262 may begin a repetition bundle of size twelve, which may accordingly end in slot 5363 in the second frame. A repetition, shown as transmission 2, may be transmitted in slot 5263, which is the next available uplink slot. Another repetition, shown as transmission 3, may be transmitted on the uplink in slot 5264 as that previously flexible slot has been re-assigned or indicated as an uplink slot. However, another repetition may not be transmitted on the uplink in slots 5265 and 5266 as those slots have been assigned as downlink slots and not uplink slots. Another repetition, shown as transmission 4, may be transmitted on the uplink in slot 5267 as that slot has been assigned as an uplink slot. Yet a further repetition, shown as transmission 5, may be transmitted on the uplink in slot 5268 as that slot has been assigned as an uplink slot, is within the bundle of size twelve and the counter has not yet been reached. Also, yet another repetition, shown as transmission 6, may be transmitted on the uplink in slot 5269 as that previously flexible slot has been re-assigned or indicated as an uplink slot and is also within the bundle size of twelve. Further, the counter of six repetitions may be reached with the uplink repetition transmission in slot 5269. Accordingly, the WTRU may toggle the NDI for a HARQ PID because the counter has reached the target of six repetitions, even though the end of the bundle of size twelve has not been reached.

This example of the WTRU toggling the NDI when the transmission counter reaches six repetitions may be considered to be more efficient than other examples provided herein above because the WTRU has completed the transmission of the TB earlier and may also start the transmission of the next TB earlier. Further, this example is more efficient than other examples provided herein above, such as examples without a transmission counter, because the WTRU may begin transmission of the next TB in the next available uplink slot in the next frame.

Accordingly, in this example, the WTRU may start transmission of the next TB, shown as transmission 1, which may be a first uplink transmission of a TB repetition, in uplink slot 5362. Slots 5360 and 5361 will not be used to start transmission of the next TB because they are downlink slots. Also, the WTRU may transmit a repetition, shown as transmission 2 in slot 5363, which is also the end of the bundle of size twelve. Accordingly, further repetitions may not be transmitted in slots 5364, 5367, 5368 or 5369 because the repetition bundle has ended and further repetitions of uplink transmissions must wait for a new bundle. In an example, the new bundle may be transmitted when a new uplink slot for the same HARQ PID becomes available. Therefore, further repetitions of transmission of the next TB may be performed in the next frame.

In another example shown in FIG. 5B, the assignments provided herein above may be applied for TB transmission where the transmission counter may be used by the WTRU to toggle an NDI when a configured number of repetitions is reached, a smaller number of repetitions in a repetition bundle may be used and flexible slots are re-assigned or indicated as uplink slots. Specifically, the assignments provided herein above may be applied for TB transmission to a first frame, including slots 5270 through 5279, and a second frame, including slots 5370 through 5379, and all slots assigned as flexible slots may be used for uplink transmissions in these frames, as seen in some other examples.

Accordingly, slots 5272, 5273, 5274, 5277, 5278, 5279, 5372, 5373, 5374, 5377, 5378 and 5379 may be used for uplink transmission. However, slots 5270, 5271, 5275, 5276, 5370, 5371, 5375 and 5376 may not be used for uplink transmission. In examples provided herein, six repetitions may be needed to meet a BLER target, as seen in other examples. Accordingly, a WTRU may toggle an NDI for a HARQ PID when a counter reaches a target number of six repetitions. Also, a repetition bundle size in this example may be set at three. For example, a RepK may be three.

As shown in an example in FIG. 5B, the first uplink transmission of a TB, shown as transmission 1, which may be a first uplink transmission of a TB repetition, may occur in slot 5272. This uplink transmission in slot 5272 may begin a repetition bundle of size three, which may accordingly end in slot 5274. A repetition, shown as transmission 2, may be transmitted in slot 5273, which is the next available uplink slot. Another repetition, shown as transmission 3, may be transmitted on the uplink in slot 5274, concluding the repetition bundle, as that previously flexible slot has been re-assigned or indicated as an uplink slot. However, another repetition may not be transmitted on the uplink in slots 5275 and 5276 as those slots have been assigned as downlink slots and not uplink slots, and the repetition bundle has concluded.

Another repetition, shown as transmission 4, may be transmitted on the uplink in slot 5277 as that slot has been assigned as an uplink slot, and a second repetition bundle of size three may begin. Yet a further repetition, shown as transmission 5, may be transmitted on the uplink in slot 5278 as that slot has been assigned as an uplink slot, is within the second bundle of size three and the counter has not yet been reached. Also, yet another repetition, shown as transmission 6, may be transmitted on the uplink in slot 5279 as that previously flexible slot has been re-assigned or indicated as an uplink slot and also concludes the bundle size of three. Further, the counter of six repetitions may be reached with the uplink repetition transmission in slot 5279. Accordingly, the WTRU may toggle the NDI for a HARQ PID because the counter has reached the target of six repetitions.

This example of the WTRU toggling the NDI when the counter reaches six repetitions and a repetition bundle of size three may be considered to be more efficient than other examples provided herein because the WTRU has completed the transmission of the TB, may also start the transmission of the next TB earlier and may end the transmission of the next TB much earlier. For example, this example is more efficient than other examples provided herein because the WTRU may begin transmission of the next TB in the next available uplink slot in the next frame and may end the transmission of the next TB in the next frame.

Accordingly, in this example, the WTRU may start transmission of the next TB, shown as transmission 1, which may be a first uplink transmission of a TB repetition, in uplink slot 5372, and may also start a third repetition bundle of size three. Slots 5370 and 5371 will not be used to start transmission of the next TB because they are downlink slots. Also, the WTRU may transmit a repetition, shown as transmission 2 in slot 5373, and another repetition, shown as transmission 3 in slot 5374. The third repetition bundle may end in slot 5374. Slots 5375 and 5376 will not be used for repetitions because they are downlink slots. Another repetition, shown as transmission 4, may be transmitted on the uplink in slot 5377 as that slot has been assigned as an uplink slot, and a fourth repetition bundle of size three may begin. Yet a further repetition, shown as transmission 5, may be transmitted on the uplink in slot 5378 as that slot has been assigned as an uplink slot, is within the fourth bundle of size three and the counter has not yet been reached. Also, yet another repetition, shown as transmission 6, may be transmitted on the uplink in slot 5379 as that previously flexible slot has been re-assigned or indicated as an uplink slot and also concludes the fourth bundle size of three. Further, the counter of six repetitions may be reached for the next TB with the uplink repetition transmission in slot 5379. Accordingly, the WTRU may toggle the NDI for a HARQ PID for the next TB because the counter has reached the target of six repetitions. In this way, the next TB has ended transmission much earlier than in other examples. As a result, this example of a counter used by the WTRU to toggle an NDI when a configured number of repetitions is reached and of a comparatively smaller number of repetitions in a repetition bundle may be considered to be more efficient than other examples.

In another example shown in FIG. 5B, the assignments provided herein above may be applied for TB transmission where the transmission counter may be used by the WTRU to toggle an NDI when a configured number of repetitions is reached, a new TB may be started earlier compared with other examples, and all flexible slots are re-assigned or indicated as uplink slots. Specifically, the assignments provided herein above may be applied for TB transmission to a first frame, including slots 5280 through 5289, and a second frame, including slots 5380 through 5389, and all slots assigned as flexible slots may be used for uplink transmissions in these frames, as seen in some other examples.

Accordingly, slots 5282, 5283, 5284, 5287, 5288, 5289, 5382, 5383, 5384, 5387, 5388 and 5389 may be used for uplink transmission. However, slots 5280, 5281, 5285, 5286, 5380, 5381, 5385 and 5386 may not be used for uplink transmission. In examples provided herein, six repetitions may be needed to meet a BLER target, as seen in other examples. Accordingly, a WTRU may toggle an NDI for a HARQ PID when a counter reaches a target number of six repetitions. Also, a repetition bundle size in this example may be set at six. Further, a RepK may be six, in an example.

As shown in an example in FIG. 5B, the first uplink transmission of a TB, which may be a first uplink transmission of a TB repetition, may occur in slot 5282. This uplink transmission, shown as transmission 1, in slot 5282 may begin a repetition bundle of size six, which may accordingly end in slot 5287. A repetition, shown as transmission 2, may occur in slot 5283, which is the next available uplink slot. Another repetition, shown as transmission 3, may be transmitted on the uplink in slot 5284 as that previously flexible slot has been re-assigned or indicated as an uplink slot. However, another repetition may not be transmitted on the uplink in slots 5285 and 5286 as those slots have been assigned as downlink slots and not uplink slots. Another repetition, shown as transmission 4, may be transmitted on the uplink in slot 5287 as that slot has been assigned as an uplink slot. However, a repetition after that may not be transmitted in slot 5238, even though that slot has been assigned as an uplink slot, because the repetition bundle ended in slot 5287. Similarly, a repetition may not be transmitted in slot 5288, even though that slot has been re-assigned or indicated from a flexible slot to an uplink slot because the repetition bundle has ended. Therefore, further repetitions of uplink transmission must wait for a new bundle. Further, the new bundle may be transmitted when a new uplink slot for the same HARQ PID becomes available. In an example, slots 5288 and 5289 may correspond to a different HARQ PID and may not be used for further uplink transmissions of a repetition of the TB.

Accordingly, the next repetition, shown as transmission 5, may be transmitted on the uplink in slot 5382, since that is the first uplink slot available in the second frame, after downlink slots 5380 and 5381. This uplink transmission 5 in slot 5382 may begin a second repetition bundle of size six, which may accordingly end in slot 5387. Further, another repetition, shown as transmission 6, may be transmitted on the uplink in slot 5383, as that slot has been assigned as an uplink slot. At transmission 6, the transmission of the TB has now reached the six repetitions required for meet the BLER target.

Further, the counter of six repetitions may be reached with the uplink repetition transmission in slot 5383. Accordingly, the WTRU may toggle the NDI for a HARQ PID because the counter has reached the target of six repetitions, even though the end of the second repetition bundle of size six has not been reached.

This example of the WTRU toggling the NDI when the counter reaches six repetitions demonstrates an increased efficiency compared with some other examples because the WTRU may start the transmission of the next TB earlier than in some other examples. This increased efficiency due to the counter holds true when compared against examples using the same bundle size. For example, this example using a counter is more efficient than other examples provided herein using a bundle size of six but not using a counter because the WTRU may begin transmission of the next TB earlier.

Accordingly, in this example, the WTRU may start transmission of the next TB, shown as transmission 1, which may be a first uplink transmission of a TB repetition, and may continue the second repetition bundle of size six in slot 5384 which is a slot previously assigned as a flexible slot and re-assigned or indicated as an uplink slot. Slots 5385 and 5386 will not be used for transmission of a repetition of the next TB because they are downlink slots. Also, the WTRU may transmit a repetition of the next TB, shown as transmission 2 in slot 5387. Since the second repetition bundle may end in slot 5387, another repetition may not be transmitted on the uplink in slot 5388 even though that slot has been assigned as an uplink slot. Similarly, a further repetition may not be transmitted in slot 5389 because the second repetition bundle has ended and further repetitions of uplink transmissions of the next TB may be performed within a new bundle. Further, the new bundle may be transmitted when a new uplink slot for the same HARQ PID as applied in slots 5384 and 5387 becomes available. In an example, further repetitions of transmission of the next TB may be performed in a future frame.

As shown in this example, the use of a counter by the WTRU to toggle an NDI when a configured number of repetitions is reached may be considered to be more efficient than other examples because the next TB may start earlier. This increased efficiency through the use of a counter may hold true no matter the size of the repetition bundle.

Accordingly, in examples provided herein shown in FIGS. 5A and 5B, a WTRU using a counter to toggle an NDI may increase efficiency in the WTRU transmitting TBs. Further, this increased efficiency continues to allow flexibility in terms of repetition bundle size. Such an approach may also be used either with a CG or with a dynamic grant. Further a WTRU shown in FIGS. 1A through 1D, such as WTRU 102, may use one or more of the examples shown in FIGS. 5A and 5B.

In an example, a WTRU may receive configuration information including uplink resources associated with one or more repetition bundles and a target number of retransmissions for a TB associated with at least one HARQ process. Then, the WTRU may transmit a first TB using a first uplink resource in a first repetition bundle based on the configuration information. Further, the WTRU may increment a retransmission counter. On a condition that the retransmission counter is less than the target number of retransmissions, the WTRU may determine a second uplink resource. Further, the WTRU may retransmit the first TB in the determined second uplink resource. Also, the WTRU may further increment the retransmission counter.

In a further example, on a condition that the retransmission counter is greater than or equal to the target number of retransmissions, the WTRU may reset the retransmission counter, toggle an NDI, determine a third uplink resource and transmit a second TB in the determined third uplink resource. In another example, the first uplink resource, the second uplink resource and the third uplink resource may be PUSCH resources. Also, the first uplink resource, the second uplink resource and the third uplink resource may be CG resources. Further, the configuration information may include CG information. In addition, the first uplink resource, the second uplink resource and the third uplink resource may be dynamic resources. Further, the configuration information may include dynamic grant information. In an example, the first uplink resource, the second uplink resource and the third uplink resource may be TDD resources.

Moreover, the second uplink resource may be in the last slot in a repetition bundle. Further, the second uplink resource may be in the first repetition bundle, in an example. In another example, the second uplink resource may be in the second repetition bundle. In addition, the NDI may be toggled at the end of a repetition bundle.

The examples, embodiments and concepts provided herein shown in FIGS. 5A and 5B, of a WTRU using a counter to toggle a setting may increase efficiency in WTRU transmissions and may apply more generally to different time measurements, time intervals, time units, time expressions, time durations, and the like, in the time domain. Further, this increased efficiency continues to allow flexibility in terms of repetition bundle size or a similar groups of repetitions. Such an approach may also be used as well with different types of signaling from a base station. Further a WTRU shown in FIGS. 1A through 1D, such as WTRU 102, may use one or more of the examples shown in FIGS. 5A and 5B as applied to different time measurements in the time domain.

For instance, the examples, embodiments and concepts provided herein shown in FIGS. 5A and 5B, of a WTRU using a counter to toggle a setting may increase efficiency in WTRU transmissions and may apply more generally to time units within sets of time units or within time unit sets. Accordingly, examples shown in FIG. 5B may be applied to time units, where examples above applied to slots, and may be applied to time unit sets, where examples above applied to frames, as described further below.

Specifically, in an example shown in FIG. 5B, the assignments provided herein above may be applied for TB transmission where a transmission counter is incremented, a repetition bundle of size twelve is used and flexible time units are re-assigned or indicated as uplink time units. Specifically, the time unit assignments provided herein above may be applied for TB transmission to a first time unit set, including time units 5260 through 5269, and a second time unit set, including time units 5360 through 5369, but all time units assigned as flexible time units may be used for uplink transmissions in these time unit sets.

Accordingly, time units 5262, 5263, 5264, 5267, 5268, 5269, 5362, 5363, 5364, 5367, 5368 and 5369 may be used for uplink transmission. However, time units 5260, 5261, 5265, 5266, 5360, 5361, 5365 and 5366 may not be used for uplink transmission. In examples provided herein, six repetitions may be needed to meet a BLER target, as seen in other examples. Further, a repetition bundle size may be set at twelve. Also, a RepK may be twelve, for example. However, in this example, a WTRU may toggle an NDI for a HARQ PID when a transmission counter reaches a target number of repetitions. The transmission counter may be configured with different target number of repetition numbers in different examples. In an example, when the repetition number needed to reach the BLER target is six, the transmission counter may be set to six. Accordingly, the WTRU may toggle the NDI for a HARQ PID when the transmission counter reaches six repetitions, which is the number of repetitions needed to meet the BLER target.

As shown in an example in FIG. 5B, the first uplink transmission of a TB, shown as transmission 1, which may be a first uplink transmission of a TB repetition, may occur in time unit 5262. This uplink transmission in time unit 5262 may begin a repetition bundle of size twelve, which may accordingly end in time unit 5363 in the second time unit set. A repetition, shown as transmission 2, may be transmitted in time unit 5263, which is the next available uplink time unit. Another repetition, shown as transmission 3, may be transmitted on the uplink in time unit 5264. Another repetition, shown as transmission 4, may be transmitted on the uplink in time unit 5267 as that time unit has been assigned as an uplink time unit. Yet a further repetition, shown as transmission 5, may be transmitted on the uplink in time unit 5268 as that time unit has been assigned as an uplink time unit, is within the bundle of size twelve and the counter has not yet been reached. Also, yet another repetition, shown as transmission 6, may be transmitted on the uplink in time unit 5269 as that previously flexible time unit has been re-assigned or indicated as an uplink time unit and is also within the bundle size of twelve. Further, the counter of six repetitions may be reached with the uplink repetition transmission in time unit 5269. Accordingly, the WTRU may toggle the NDI for a HARQ PID because the counter has reached the target of six repetitions, even though the end of the bundle of size twelve has not been reached.

This example of the WTRU toggling the NDI when the transmission counter reaches six repetitions may be considered to be more efficient than other examples provided herein above because the WTRU has completed the transmission of the TB earlier and may also start the transmission of the next TB earlier. Further, this example is more efficient than other examples provided herein above, such as examples without a transmission counter, because the WTRU may begin transmission of the next TB in the next available uplink time unit in the next time unit set.

Accordingly, in this example, the WTRU may start transmission of the next TB, shown as transmission 1, which may be a first uplink transmission of a TB repetition, in uplink time unit 5362. Also, the WTRU may transmit a repetition, shown as transmission 2 in time unit 5363, which is also the end of the bundle of size twelve. Accordingly, further repetitions may not be transmitted in time units 5364, 5367, 5368 or 5369 because the repetition bundle has ended and further repetitions of uplink transmissions must wait for a new bundle. In an example, the new bundle may be transmitted when a new uplink time unit for the same HARQ PID becomes available. Therefore, further repetitions of transmission of the next TB may be performed in the next time unit set.

In another example shown in FIG. 5B, the assignments provided herein above may be applied for TB transmission where the transmission counter may be used by the WTRU to toggle an NDI when a configured number of repetitions is reached, a smaller number of repetitions in a repetition bundle may be used and flexible time units are re-assigned or indicated as uplink time units. Specifically, the assignments provided herein above may be applied for TB transmission to a first time unit set, including time units 5270 through 5279, and a second time unit set, including time units 5370 through 5379, and all time units assigned as flexible time units may be used for uplink transmissions in these time unit sets, as seen in some other examples.

Accordingly, time units 5272, 5273, 5274, 5277, 5278, 5279, 5372, 5373, 5374, 5377, 5378 and 5379 may be used for uplink transmission. However, time units 5270, 5271, 5275, 5276, 5370, 5371, 5375 and 5376 may not be used for uplink transmission. In examples provided herein, six repetitions may be needed to meet a BLER target, as seen in other examples. Accordingly, a WTRU may toggle an NDI for a HARQ PID when a counter reaches a target number of six repetitions. Also, a repetition bundle size in this example may be set at three. For example, a RepK may be three.

As shown in an example in FIG. 5B, the first uplink transmission of a TB, shown as transmission 1, which may be a first uplink transmission of a TB repetition, may occur in time unit 5272. This uplink transmission in time unit 5272 may begin a repetition bundle of size three, which may accordingly end in time unit 5274. A repetition, shown as transmission 2, may be transmitted in time unit 5273, which is the next available uplink time unit. Another repetition, shown as transmission 3, may be transmitted on the uplink in time unit 5274, concluding the repetition bundle, as that previously flexible time unit has been re-assigned or indicated as an uplink time unit.

Another repetition, shown as transmission 4, may be transmitted on the uplink in time unit 5277 as that time unit has been assigned as an uplink time unit, and a second repetition bundle of size three may begin. Yet a further repetition, shown as transmission 5, may be transmitted on the uplink in time unit 5278 as that time unit has been assigned as an uplink time unit, is within the second bundle of size three and the counter has not yet been reached. Also, yet another repetition, shown as transmission 6, may be transmitted on the uplink in time unit 5279 as that previously flexible time unit has been re-assigned or indicated as an uplink time unit and also concludes the bundle size of three. Further, the counter of six repetitions may be reached with the uplink repetition transmission in time unit 5279. Accordingly, the WTRU may toggle the NDI for a HARQ PID because the counter has reached the target of six repetitions.

This example of the WTRU toggling the NDI when the counter reaches six repetitions and a repetition bundle of size three may be considered to be more efficient than other examples provided herein because the WTRU has completed the transmission of the TB, may also start the transmission of the next TB earlier and may end the transmission of the next TB much earlier. For example, this example is more efficient than other examples provided herein because the WTRU may begin transmission of the next TB in the next available uplink time unit in the next time unit set and may end the transmission of the next TB in the next time unit set.

Accordingly, in this example, the WTRU may start transmission of the next TB, shown as transmission 1, which may be a first uplink transmission of a TB repetition, in uplink time unit 5372, and may also start a third repetition bundle of size three. Also, the WTRU may transmit a repetition, shown as transmission 2 in time unit 5373, and another repetition, shown as transmission 3 in time unit 5374. The third repetition bundle may end in time unit 5374. Another repetition, shown as transmission 4, may be transmitted on the uplink in time unit 5377 as that time unit has been assigned as an uplink time unit, and a fourth repetition bundle of size three may begin. Yet a further repetition, shown as transmission 5, may be transmitted on the uplink in time unit 5378 as that time unit has been assigned as an uplink time unit, is within the fourth bundle of size three and the counter has not yet been reached. Also, yet another repetition, shown as transmission 6, may be transmitted on the uplink in time unit 5379 as that previously flexible time unit has been re-assigned or indicated as an uplink time unit and also concludes the fourth bundle size of three. Further, the counter of six repetitions may be reached for the next TB with the uplink repetition transmission in time unit 5379. Accordingly, the WTRU may toggle the NDI for a HARQ PID for the next TB because the counter has reached the target of six repetitions. In this way, the next TB has ended transmission much earlier than in other examples. As a result, this example of a counter used by the WTRU to toggle an NDI when a configured number of repetitions is reached and of a comparatively smaller number of repetitions in a repetition bundle may be considered to be more efficient than other examples.

In another example shown in FIG. 5B, the assignments provided herein above may be applied for TB transmission where the transmission counter may be used by the WTRU to toggle an NDI when a configured number of repetitions is reached, a new TB may be started earlier compared with other examples, and all flexible time units are re-assigned or indicated as uplink time units. Specifically, the assignments provided herein above may be applied for TB transmission to a first time unit set, including time units 5280 through 5289, and a second time unit set, including time units 5380 through 5389, and all time units assigned as flexible time units may be used for uplink transmissions in these time unit sets, as seen in some other examples.

Accordingly, time units 5282, 5283, 5284, 5287, 5288, 5289, 5382, 5383, 5384, 5387, 5388 and 5389 may be used for uplink transmission. However, time units 5280, 5281, 5285, 5286, 5380, 5381, 5385 and 5386 may not be used for uplink transmission. In examples provided herein, six repetitions may be needed to meet a BLER target, as seen in other examples. Accordingly, a WTRU may toggle an NDI for a HARQ PID when a counter reaches a target number of six repetitions. Also, a repetition bundle size in this example may be set at six. Further, a RepK may be six, in an example.

As shown in an example in FIG. 5B, the first uplink transmission of a TB, which may be a first uplink transmission of a TB repetition, may occur in time unit 5282. This uplink transmission, shown as transmission 1, in time unit 5282 may begin a repetition bundle of size six, which may accordingly end in time unit 5287. A repetition, shown as transmission 2, may occur in time unit 5283, which is the next available uplink time unit. Another repetition, shown as transmission 3, may be transmitted on the uplink in time unit 5284 as that previously flexible time unit has been re-assigned or indicated as an uplink time unit. However, another repetition may not be transmitted on the uplink in time units 5285 and 5286 as those time units have been assigned as downlink time units and not uplink time units. Another repetition, shown as transmission 4, may be transmitted on the uplink in time unit 5287 as that time unit has been assigned as an uplink time unit. However, a repetition after that may not be transmitted in time unit 5238, even though that time unit has been assigned as an uplink time unit, because the repetition bundle ended in time unit 5287. Similarly, a repetition may not be transmitted in time unit 5288, even though that time unit has been re-assigned or indicated from a flexible time unit to an uplink time unit because the repetition bundle has ended. Therefore, further repetitions of uplink transmission must wait for a new bundle. Further, the new bundle may be transmitted when a new uplink time unit for the same HARQ PID becomes available. In an example, time units 5288 and 5289 may correspond to a different HARQ PID and may not be used for further uplink transmissions of a repetition of the TB.

Accordingly, the next repetition, shown as transmission 5, may be transmitted on the uplink in time unit 5382, since that is the first uplink time unit available in the second time unit set, after downlink time units 5380 and 5381. This uplink transmission 5 in time unit 5382 may begin a second repetition bundle of size six, which may accordingly end in time unit 5387. Further, another repetition, shown as transmission 6, may be transmitted on the uplink in time unit 5383, as that time unit has been assigned as an uplink time unit. At transmission 6, the transmission of the TB has now reached the six repetitions required for meet the BLER target.

Further, the counter of six repetitions may be reached with the uplink repetition transmission in time unit 5383. Accordingly, the WTRU may toggle the NDI for a HARQ PID because the counter has reached the target of six repetitions, even though the end of the second repetition bundle of size six has not been reached.

This example of the WTRU toggling the NDI when the counter reaches six repetitions demonstrates an increased efficiency compared with some other examples because the WTRU may start the transmission of the next TB earlier than in some other examples. This increased efficiency due to the counter holds true when compared against examples using the same bundle size. For example, this example using a counter is more efficient than other examples provided herein using a bundle size of six but not using a counter because the WTRU may begin transmission of the next TB earlier.

Accordingly, in this example, the WTRU may start transmission of the next TB, shown as transmission 1, which may be a first uplink transmission of a TB repetition, and may continue the second repetition bundle of size six in time unit 5384 which is a time unit previously assigned as a flexible time unit and re-assigned or indicated as an uplink time unit. Also, the WTRU may transmit a repetition of the next TB, shown as transmission 2 in time unit 5387. Since the second repetition bundle may end in time unit 5387, another repetition may not be transmitted on the uplink in time unit 5388 even though that time unit has been assigned as an uplink time unit. Similarly, a further repetition may not be transmitted in time unit 5389 because the second repetition bundle has ended and further repetitions of uplink transmissions of the next TB may be performed within a new bundle. Further, the new bundle may be transmitted when a new uplink time unit for the same HARQ PID as applied in time units 5384 and 5387 becomes available. In an example, further repetitions of transmission of the next TB may be performed in a future time unit set.

Moreover, the examples, embodiments and concepts provided herein shown in FIGS. 5A and 5B, of a WTRU using a counter to toggle a setting may increase efficiency in the WTRU transmissions and may apply to symbols within slots. Accordingly, examples shown in FIG. 5B may be applied to symbols, where examples above applied to slots, and may be applied to slots, where examples above applied to frames, as described further below.

Specifically, in an example shown in FIG. 5B, the assignments provided herein above may be applied for TB transmission where a transmission counter is incremented, a repetition bundle of size twelve is used and flexible symbols are re-assigned or indicated as uplink symbols. Specifically, the symbol assignments provided herein above may be applied for TB transmission to a first slot, including symbols 5260 through 5269, and a second slot, including symbols 5360 through 5369, but all symbols assigned as flexible symbols may be used for uplink transmissions in these slots.

Accordingly, symbols 5262, 5263, 5264, 5267, 5268, 5269, 5362, 5363, 5364, 5367, 5368 and 5369 may be used for uplink transmission. However, symbols 5260, 5261, 5265, 5266, 5360, 5361, 5365 and 5366 may not be used for uplink transmission. In examples provided herein, six repetitions may be needed to meet a BLER target, as seen in other examples. Further, a repetition bundle size may be set at twelve. Also, a RepK may be twelve, for example. However, in this example, a WTRU may toggle an NDI for a HARQ PID when a transmission counter reaches a target number of repetitions. The transmission counter may be configured with different target number of repetition numbers in different examples. In an example, when the repetition number needed to reach the BLER target is six, the transmission counter may be set to six. Accordingly, the WTRU may toggle the NDI for a HARQ PID when the transmission counter reaches six repetitions, which is the number of repetitions needed to meet the BLER target.

As shown in an example in FIG. 5B, the first uplink transmission of a TB, shown as transmission 1, which may be a first uplink transmission of a TB repetition, may occur in symbol 5262. This uplink transmission in symbol 5262 may begin a repetition bundle of size twelve, which may accordingly end in symbol 5363 in the second slot. A repetition, shown as transmission 2, may be transmitted in symbol 5263, which is the next available uplink symbol. Another repetition, shown as transmission 3, may be transmitted on the uplink in symbol 5264. Another repetition, shown as transmission 4, may be transmitted on the uplink in symbol 5267 as that symbol has been assigned as an uplink symbol. Yet a further repetition, shown as transmission 5, may be transmitted on the uplink in symbol 5268 as that symbol has been assigned as an uplink symbol, is within the bundle of size twelve and the counter has not yet been reached. Also, yet another repetition, shown as transmission 6, may be transmitted on the uplink in symbol 5269 as that previously flexible symbol has been re-assigned or indicated as an uplink symbol and is also within the bundle size of twelve. Further, the counter of six repetitions may be reached with the uplink repetition transmission in symbol 5269. Accordingly, the WTRU may toggle the NDI for a HARQ PID because the counter has reached the target of six repetitions, even though the end of the bundle of size twelve has not been reached.

This example of the WTRU toggling the NDI when the transmission counter reaches six repetitions may be considered to be more efficient than other examples provided herein above because the WTRU has completed the transmission of the TB earlier and may also start the transmission of the next TB earlier. Further, this example is more efficient than other examples provided herein above, such as examples without a transmission counter, because the WTRU may begin transmission of the next TB in the next available uplink symbol in the next slot.

Accordingly, in this example, the WTRU may start transmission of the next TB, shown as transmission 1, which may be a first uplink transmission of a TB repetition, in uplink symbol 5362. Also, the WTRU may transmit a repetition, shown as transmission 2 in symbol 5363, which is also the end of the bundle of size twelve. Accordingly, further repetitions may not be transmitted in symbols 5364, 5367, 5368 or 5369 because the repetition bundle has ended and further repetitions of uplink transmissions must wait for a new bundle. In an example, the new bundle may be transmitted when a new uplink symbol for the same HARQ PID becomes available. Therefore, further repetitions of transmission of the next TB may be performed in the next slot.

In another example shown in FIG. 5B, the assignments provided herein above may be applied for TB transmission where the transmission counter may be used by the WTRU to toggle an NDI when a configured number of repetitions is reached, a smaller number of repetitions in a repetition bundle may be used and flexible symbols are re-assigned or indicated as uplink symbols. Specifically, the assignments provided herein above may be applied for TB transmission to a first slot, including symbols 5270 through 5279, and a second slot, including symbols 5370 through 5379, and all symbols assigned as flexible symbols may be used for uplink transmissions in these slots, as seen in some other examples.

Accordingly, symbols 5272, 5273, 5274, 5277, 5278, 5279, 5372, 5373, 5374, 5377, 5378 and 5379 may be used for uplink transmission. However, symbols 5270, 5271, 5275, 5276, 5370, 5371, 5375 and 5376 may not be used for uplink transmission. In examples provided herein, six repetitions may be needed to meet a BLER target, as seen in other examples. Accordingly, a WTRU may toggle an NDI for a HARQ PID when a counter reaches a target number of six repetitions. Also, a repetition bundle size in this example may be set at three. For example, a RepK may be three.

As shown in an example in FIG. 5B, the first uplink transmission of a TB, shown as transmission 1, which may be a first uplink transmission of a TB repetition, may occur in symbol 5272. This uplink transmission in symbol 5272 may begin a repetition bundle of size three, which may accordingly end in symbol 5274. A repetition, shown as transmission 2, may be transmitted in symbol 5273, which is the next available uplink symbol. Another repetition, shown as transmission 3, may be transmitted on the uplink in symbol 5274, concluding the repetition bundle, as that previously flexible symbol has been re-assigned or indicated as an uplink symbol.

Another repetition, shown as transmission 4, may be transmitted on the uplink in symbol 5277 as that symbol has been assigned as an uplink symbol, and a second repetition bundle of size three may begin. Yet a further repetition, shown as transmission 5, may be transmitted on the uplink in symbol 5278 as that symbol has been assigned as an uplink symbol, is within the second bundle of size three and the counter has not yet been reached. Also, yet another repetition, shown as transmission 6, may be transmitted on the uplink in symbol 5279 as that previously flexible symbol has been re-assigned or indicated as an uplink symbol and also concludes the bundle size of three. Further, the counter of six repetitions may be reached with the uplink repetition transmission in symbol 5279. Accordingly, the WTRU may toggle the NDI for a HARQ PID because the counter has reached the target of six repetitions.

This example of the WTRU toggling the NDI when the counter reaches six repetitions and a repetition bundle of size three may be considered to be more efficient than other examples provided herein because the WTRU has completed the transmission of the TB, may also start the transmission of the next TB earlier and may end the transmission of the next TB much earlier. For example, this example is more efficient than other examples provided herein because the WTRU may begin transmission of the next TB in the next available uplink symbol in the next slot and may end the transmission of the next TB in the next slot.

Accordingly, in this example, the WTRU may start transmission of the next TB, shown as transmission 1, which may be a first uplink transmission of a TB repetition, in uplink symbol 5372, and may also start a third repetition bundle of size three. Also, the WTRU may transmit a repetition, shown as transmission 2 in symbol 5373, and another repetition, shown as transmission 3 in symbol 5374. The third repetition bundle may end in symbol 5374. Another repetition, shown as transmission 4, may be transmitted on the uplink in symbol 5377 as that symbol has been assigned as an uplink symbol, and a fourth repetition bundle of size three may begin. Yet a further repetition, shown as transmission 5, may be transmitted on the uplink in symbol 5378 as that symbol has been assigned as an uplink symbol, is within the fourth bundle of size three and the counter has not yet been reached. Also, yet another repetition, shown as transmission 6, may be transmitted on the uplink in symbol 5379 as that previously flexible symbol has been re-assigned or indicated as an uplink symbol and also concludes the fourth bundle size of three. Further, the counter of six repetitions may be reached for the next TB with the uplink repetition transmission in symbol 5379. Accordingly, the WTRU may toggle the NDI for a HARQ PID for the next TB because the counter has reached the target of six repetitions. In this way, the next TB has ended transmission much earlier than in other examples. As a result, this example of a counter used by the WTRU to toggle an NDI when a configured number of repetitions is reached and of a comparatively smaller number of repetitions in a repetition bundle may be considered to be more efficient than other examples.

In another example shown in FIG. 5B, the assignments provided herein above may be applied for TB transmission where the transmission counter may be used by the WTRU to toggle an NDI when a configured number of repetitions is reached, a new TB may be started earlier compared with other examples, and all flexible symbols are re-assigned or indicated as uplink symbols. Specifically, the assignments provided herein above may be applied for TB transmission to a first slot, including symbols 5280 through 5289, and a second slot, including symbols 5380 through 5389, and all symbols assigned as flexible symbols may be used for uplink transmissions in these slots, as seen in some other examples.

Accordingly, symbols 5282, 5283, 5284, 5287, 5288, 5289, 5382, 5383, 5384, 5387, 5388 and 5389 may be used for uplink transmission. However, symbols 5280, 5281, 5285, 5286, 5380, 5381, 5385 and 5386 may not be used for uplink transmission. In examples provided herein, six repetitions may be needed to meet a BLER target, as seen in other examples. Accordingly, a WTRU may toggle an NDI for a HARQ PID when a counter reaches a target number of six repetitions. Also, a repetition bundle size in this example may be set at six. Further, a RepK may be six, in an example.

As shown in an example in FIG. 5B, the first uplink transmission of a TB, which may be a first uplink transmission of a TB repetition, may occur in symbol 5282. This uplink transmission, shown as transmission 1, in symbol 5282 may begin a repetition bundle of size six, which may accordingly end in symbol 5287. A repetition, shown as transmission 2, may occur in symbol 5283, which is the next available uplink symbol. Another repetition, shown as transmission 3, may be transmitted on the uplink in symbol 5284 as that previously flexible symbol has been re-assigned or indicated as an uplink symbol. However, another repetition may not be transmitted on the uplink in symbols 5285 and 5286 as those symbols have been assigned as downlink symbols and not uplink symbols. Another repetition, shown as transmission 4, may be transmitted on the uplink in symbol 5287 as that symbol has been assigned as an uplink symbol. However, a repetition after that may not be transmitted in symbol 5238, even though that symbol has been assigned as an uplink symbol, because the repetition bundle ended in symbol 5287. Similarly, a repetition may not be transmitted in symbol 5288, even though that symbol has been re-assigned or indicated from a flexible symbol to an uplink symbol because the repetition bundle has ended. Therefore, further repetitions of uplink transmission must wait for a new bundle. Further, the new bundle may be transmitted when a new uplink symbol for the same HARQ PID becomes available. In an example, symbols 5288 and 5289 may correspond to a different HARQ PID and may not be used for further uplink transmissions of a repetition of the TB.

Accordingly, the next repetition, shown as transmission 5, may be transmitted on the uplink in symbol 5382, since that is the first uplink symbol available in the second slot, after downlink symbols 5380 and 5381. This uplink transmission 5 in symbol 5382 may begin a second repetition bundle of size six, which may accordingly end in symbol 5387. Further, another repetition, shown as transmission 6, may be transmitted on the uplink in symbol 5383, as that symbol has been assigned as an uplink symbol. At transmission 6, the transmission of the TB has now reached the six repetitions required for meet the BLER target.

Further, the counter of six repetitions may be reached with the uplink repetition transmission in symbol 5383. Accordingly, the WTRU may toggle the NDI for a HARQ PID because the counter has reached the target of six repetitions, even though the end of the second repetition bundle of size six has not been reached.

This example of the WTRU toggling the NDI when the counter reaches six repetitions demonstrates an increased efficiency compared with some other examples because the WTRU may start the transmission of the next TB earlier than in some other examples. This increased efficiency due to the counter holds true when compared against examples using the same bundle size. For example, this example using a counter is more efficient than other examples provided herein using a bundle size of six but not using a counter because the WTRU may begin transmission of the next TB earlier.

Accordingly, in this example, the WTRU may start transmission of the next TB, shown as transmission 1, which may be a first uplink transmission of a TB repetition, and may continue the second repetition bundle of size six in symbol 5384 which is a symbol previously assigned as a flexible symbol and re-assigned or indicated as an uplink symbol. Also, the WTRU may transmit a repetition of the next TB, shown as transmission 2 in symbol 5387. Since the second repetition bundle may end in symbol 5387, another repetition may not be transmitted on the uplink in symbol 5388 even though that symbol has been assigned as an uplink symbol. Similarly, a further repetition may not be transmitted in symbol 5389 because the second repetition bundle has ended and further repetitions of uplink transmissions of the next TB may be performed within a new bundle. Further, the new bundle may be transmitted when a new uplink symbol for the same HARQ PID as applied in symbols 5384 and 5387 becomes available. In an example, further repetitions of transmission of the next TB may be performed in a future slot.

Examples for conditions for cancellation of repetitions for TDD are described herein. In some semi-static configurations for TDD, the configuration may comprise a mixture of uplink slots or symbols and downlink slots or symbols. In a TDD frame split of [D, D, D, U, U, D, D, D, U, U], while the WTRU repeats an uplink TB transmission, the WTRU may determine that retransmission is not necessary and cancel the repetitions before the repK is reached.

In a further example, in some semi-static configurations for transmission, the configuration may comprise a mixture of uplink time units and downlink time units. In a set of time units split of [D, D, D, U, U, D, D, D, U, U], while the WTRU repeats an uplink TB transmission, the WTRU may determine that retransmission is not necessary and cancel the repetitions in time units before the repK is reached. For example, in some semi-static configurations for transmission, the configuration may comprise a mixture of uplink symbols and downlink symbols. Further, in an uplink slot split of [D, D, D, U, U, D, D, D, U, U], while the WTRU repeats an uplink TB transmission, the WTRU may determine that retransmission is not necessary and cancel the repetitions in symbols before the repK is reached.

Examples for explicit or implicit indication to cancel repetition are described herein. In one example, a WTRU may receive an explicit indication from a base station, for example, a gNB, to interrupt repetitions while the WTRU waits for next uplink slot to complete the specified number of repetitions. Thus, the WTRU may cancel or suspend repetition before the repetition counter reaches repK. For example, the WTRU may receive a dynamic notification in DCI or a MAC-CE to terminate or suspend repetitions from the network in the downlink slots.

If a MAC-CE is used as an explicit indication, the WTRU may receive a MAC-CE which includes a CG ID or a HARQ sequence ID which is associated with the repetition transmission the WTRU is indicated to cancel. The MAC CE may also include a number of remaining repetitions to perform, for example, which can be less than the remaining repetitions to reach RepK, after which the WTRU cancels or suspends the repetitions/transmission.

If the DCI is used to indicate cancel the repetition, the WTRU may receive DCI scheduling a PUSCH transmission overlapping in time with the repetition transmission. In that case, the WTRU may cancel the repetition and subsequent repetitions. Granularity of the overlap may be a slot or a symbol. For example, DCI may schedule PUSCH at a slot level or a symbol level.

The WTRU may receive DCI with an NDI toggled for the HARQ process for which repK has not been reached. Upon reception of such DCI, the WTRU may cancel remaining repetitions. Such DCI may schedule another PUSCH transmission for the same HARQ process.

In some embodiments, the WTRU may receive DCI which includes the parameters of the repetition that the WTRU is indicated to cancel. Such parameters may include, but are not limited to, at least one of the following: HARQ process ID; CG index; and/or a start and length indicator value (SLIV) indicating the portion of repetition that needs to be interrupted. The portion may be overlapped with another channel or reference signals.

Such DCI may be a new DCI format or an existing DCI format with at least one field set to a pre-defined value indicating that the DCI is to cancel repetition(s) without scheduling additional PUSCH. For example, the frequency domain resource allocation field may be set to all zeros (0).

The WTRU may implicitly interrupt repetition if channels or reference signals other than a PUSCH is dynamically scheduled in the uplink slot. For example, such channels or reference signals may be a SRS, a PUCCH or a physical random access channel (PRACH).

Examples for postponing repetition are described herein. In an example, when a WTRU interrupts the repetition, the WTRU may determine to continue the remaining repetition when it encounters the next transmission opportunities or the WTRU may determine to terminate the repetition. The WTRU may determine to terminate the repetition based on an explicit indication from the network. The WTRU may continue to transmit repetitions if the repetition counter is below the predetermined threshold. The WTRU may be configured with the predetermined threshold by RRC signaling, a MAC-CE or DCI. If the WTRU continues to transmit the remaining repetitions, the WTRU may select the same HARQ process ID.

The WTRU may receive DCI or RRC signaling indicating resuming the transmission of remaining repetitions and/or a CG within which the WTRU can continue the remaining repetition. In addition, the WTRU may receive DCI or RRC signaling indicating the HARQ ID that the WTRU may use to transmit the remaining repetitions.

Examples for repetition until the next downlink slot are described herein. A WTRU may repeat the transmission up to repK or until the next downlink slot or downlink symbol. The behavior may be useful when uplink slots are configured in a burst, proving more concentrated opportunities for the WTRU to perform the repetition. The WTRU may receive an indication from DCI or RRC signaling indicating a CG within which the WTRU can transmit the repetition until the next downlink is encountered.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a wireless transmit/receive unit (WTRU), the method comprising:
   receiving configuration information including uplink resources associated with one or more repetition bundles and a target number of transmissions for a transport block (TB) associated with at least one hybrid automatic repeat request (HARQ) process;
   transmitting a first TB using a first uplink resource in a first repetition bundle based on the configuration information;
   incrementing a transmission counter;
   on a condition that the transmission counter is less than the target number of transmissions, determining a second uplink resource;
   transmitting the first TB in the determined second uplink resource;
   further incrementing the transmission counter; and
   on a condition that the transmission counter is greater than or equal to the target number of transmissions:
      resetting the transmission counter;
      toggling a new data indicator (NDI);
      determining a third uplink resource; and
      transmitting a second TB in the determined third uplink resource.

2. The method of claim 1, wherein the determined second uplink resource is in one of: the last slot in a repetition bundle, the first repetition bundle, or a second repetition bundle.

3. The method of claim 1, wherein the first uplink resource, the determined second uplink resource and the determined third uplink resource are physical uplink shared channel (PUSCH) resources.

4. The method of claim 1, wherein the first uplink resource, the determined second uplink resource and the determined third uplink resource are configured grant (CG) resources.

5. The method of claim 1, wherein the first uplink resource, the determined second uplink resource and the determined third uplink resource are dynamic grant resources, and the configuration information includes dynamic grant information.

6. The method of claim 1, wherein the NDI is toggled at the end of the first repetition bundle.

7. The method of claim 1, wherein the first uplink resource, the determined second uplink resource and the determined third uplink resource are time division duplex (TDD) resources.

8. A wireless transmit/receive unit (WTRU) comprising:
   a transceiver; and
   a processor operatively coupled to the transceiver; wherein:
      the transceiver is configured to receive configuration information including uplink resources associated with one or more repetition bundles and a target number of transmissions for a transport block (TB) associated with at least one hybrid automatic repeat request (HARQ) process;
      the transceiver is configured to transmit a first TB using a first uplink resource in a first repetition bundle based on the configuration information;
      the processor is configured to increment a transmission counter;
      the processor is configured to, on a condition that the transmission counter is less than the target number of transmissions, determine a second uplink resource;
      the transceiver is configured to transmit the first TB in the determined second uplink resource;
      the processor is configured to further increment the transmission counter; and
      the processor is configured to, on a condition that the transmission counter is greater than or equal to the target number of transmissions:
         reset the transmission counter,
         toggle a new data indicator (NDI), and
         determine a third uplink resource; wherein the transceiver is configured to transmit a second TB in the determined third uplink resource.

9. The WTRU of claim 8, wherein the determined second uplink resource is in one of: the last slot in a repetition bundle, the first repetition bundle, or a second repetition bundle.

10. The WTRU of claim 8, wherein the first uplink resource, the determined second uplink resource and the determined third uplink resource are physical uplink shared channel (PUSCH) resources.

11. The WTRU of claim 8, wherein the first uplink resource, the determined second uplink resource and the determined third uplink resource are configured grant (CG) resources.

12. The WTRU of claim 8, wherein the first uplink resource, the determined second uplink resource and the determined third uplink resource are dynamic grant resources, and the configuration information includes dynamic grant information.

13. The WTRU of claim 8, wherein the NDI is toggled at the end of the first repetition bundle.

14. The WTRU of claim 8, wherein the first uplink resource, the determined second uplink resource and the determined third uplink resource are time division duplex (TDD) resources.

15. The method of claim 1, wherein the configuration information includes CG information.

16. The method of claim 1, wherein the first TB is transmitted in the determined second uplink resource on a condition that a CG time has not elapsed.

17. The WTRU of claim 8, wherein the configuration information includes CG information.

18. The WTRU of claim 8, wherein the first TB is transmitted in the determined second uplink resource on a condition that a CG time has not elapsed.

* * * * *